(12) United States Patent
Nagata

(10) Patent No.: US 11,987,182 B2
(45) Date of Patent: May 21, 2024

(54) IMAGE PROCESSING APPARATUS, IMAGE PROCESSING METHOD, AND IMAGE PROCESSING SYSTEM

(71) Applicant: Sony Group Corporation, Tokyo (JP)

(72) Inventor: Koji Nagata, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 267 days.

(21) Appl. No.: 17/289,735

(22) PCT Filed: Dec. 10, 2019

(86) PCT No.: PCT/JP2019/048364
§ 371 (c)(1),
(2) Date: Apr. 29, 2021

(87) PCT Pub. No.: WO2020/122085
PCT Pub. Date: Jun. 18, 2020

(65) Prior Publication Data
US 2022/0001803 A1   Jan. 6, 2022

(30) Foreign Application Priority Data

Dec. 11, 2018  (JP) .................................. 2018-232050

(51) Int. Cl.
*B60R 1/00*  (2022.01)
*B60R 1/02*  (2006.01)
(Continued)

(52) U.S. Cl.
CPC ................ *B60R 1/007* (2013.01); *B60R 1/02* (2013.01); *G06T 7/11* (2017.01); *H04N 23/64* (2023.01);
(Continued)

(58) Field of Classification Search
CPC ... G06F 3/013; G06F 3/012; B60K 2370/149; B60K 2370/194; B60K 2370/193;
(Continued)

(56) References Cited

U.S. PATENT DOCUMENTS 10,116,873 B1 * 10/2018 Campbell ................ G02B 5/08
2007/0072154 A1   3/2007 Akatsuka
(Continued)

FOREIGN PATENT DOCUMENTS

CN        102448773 A    5/2012
CN        103987578 A    8/2014
(Continued)

OTHER PUBLICATIONS

International Search Report and Written Opinion dated Mar. 3, 2020 received for PCT Application PCT/ JP2019/048364, Filed on Dec. 10, 2019, 11 pages including English Translation.

*Primary Examiner* — Nathnael Aynalem
(74) *Attorney, Agent, or Firm* — XSENSUS LLP

(57) ABSTRACT

A display image to be displayed on a display unit is obtained in accordance with motion of a viewpoint of a driver, on the basis of a captured image obtained by capturing an image on a rear side from a vehicle, when a line-of-sight of the driver is in a certain region including the display unit. For example, the display image is obtained in accordance with a deviation of a viewpoint position of the driver from a reference viewpoint position. For example, the reference viewpoint position is updated on the basis of a long-term fluctuation of the viewpoint position. For example, the reference viewpoint position is not updated when a line-of-sight of the driver is in a certain region including a display unit that displays a display image.

20 Claims, 30 Drawing Sheets

(51) Int. Cl.
   *B60R 1/12* (2006.01)
   *G06T 7/11* (2017.01)
   *H04N 23/60* (2023.01)
(52) U.S. Cl.
   CPC ... *B60R 2001/1253* (2013.01); *B60R 2300/10* (2013.01); *B60R 2300/202* (2013.01); *G06T 2207/30261* (2013.01)
(58) Field of Classification Search
   CPC ........ B60K 2370/155; B60K 2370/186; B60K 2370/736; B60K 2370/21; B60K 2370/741; G02B 27/0093; G02B 27/01; G02B 27/0179; G02B 2027/014; G02B 2027/0138; B60R 1/00; B60R 1/02; B60R 2001/1253; B60R 2300/202; B60R 2300/205; B60R 2300/207; B60R 2300/8046; B60R 2300/20; B60R 2300/30; B60R 2300/802; B60R 2300/8026; B60R 2300/806; B60R 2300/8066; G05B 2219/35503
   USPC ......................................................... 348/148
   See application file for complete search history.

(56) References Cited

U.S. PATENT DOCUMENTS

| | | | |
|---|---|---|---|
| 2012/0154441 A1* | 6/2012 | Kim | G08G 1/09623 345/633 |
| 2012/0242834 A1 | 9/2012 | Satoh et al. | |
| 2013/0073114 A1 | 3/2013 | Nemat-Nasser et al. | |
| 2013/0258512 A1 | 10/2013 | Raz et al. | |
| 2014/0204193 A1 | 7/2014 | Zhang | |
| 2016/0280136 A1 | 9/2016 | Besson | |
| 2016/0288717 A1* | 10/2016 | Kameshima | G06F 3/013 |
| 2017/0150230 A1* | 5/2017 | Shimura | G06F 3/0484 |
| 2017/0305345 A1* | 10/2017 | Hashimoto | H04N 23/635 |
| 2019/0278094 A1* | 9/2019 | Huang | G02B 27/0093 |

FOREIGN PATENT DOCUMENTS

| | | |
|---|---|---|
| CN | 105073499 A | 11/2015 |
| CN | 105814886 A | 7/2016 |
| CN | 106143306 A | 11/2016 |
| CN | 107074150 A | 8/2017 |
| CN | 113170081 A | 7/2021 |
| CN | 113170082 A | 7/2021 |
| CN | 113170083 A | 7/2021 |
| EP | 2512134 A1 | 10/2012 |
| JP | 2005-106648 A | 4/2005 |
| JP | 2009-100180 A | 5/2009 |
| JP | 2013-216286 A | 10/2013 |
| JP | 2014067120 A | 4/2014 |
| JP | 2014-225728 A | 12/2014 |
| JP | 2016-105256 A | 6/2016 |
| JP | 2016-210212 A | 12/2016 |
| JP | 2017-111739 A | 6/2017 |
| JP | 2017-196911 A | 11/2017 |
| TW | I642972 B | 12/2018 |

* cited by examiner

EXAMPLE OF REAR VISUAL FIELD (a)

SIDE MIRROR (REAL MIRROR)

(b)

ELECTRONIC MIRROR (c)

CAMERA IMAGE (a)

(b)

(c)

ated driver
IMAGE PROCESSING APPARATUS, IMAGE PROCESSING METHOD, AND IMAGE PROCESSING SYSTEM

CROSS-REFERENCE TO RELATED APPLICATIONS

The present application is based on PCT filing PCT/JP2019/048364, filed Dec. 10, 2019, which claims priority to JP 2018-232050, filed Dec. 11, 2018, the entire contents of each are incorporated herein by reference.

TECHNICAL FIELD

The present technology relates to an image processing apparatus, an image processing method, and an image processing system, and more particularly to an image processing apparatus and the like suitable for applying to an in-vehicle electronic mirror.

BACKGROUND ART

Conventionally, in-vehicle electronic mirrors have been proposed in which rearview mirrors of vehicles (room mirrors and left and right door mirrors) are replaced with cameras and displays. Patent Document 1 proposes a technique for varying a range of a camera image to be displayed on a display by using a relative position of the driver's head with respect to a display, in order to solve a difference of appearance in an electronic mirror from appearance in an actual mirror.

CITATION LIST

Patent Document

Patent Document 1: Japanese Patent Application Laid-Open No. 2013-216286

SUMMARY OF THE INVENTION

Problems to be Solved by the Invention

The technique described in Patent Document 1 can provide a visual field that is intuitive and easily viewable, because a display view angle of a rear video image changes in accordance with head motion. However, even in a case where a driver is not carrying out looking operation, the display view angle of the rear video image changes in accordance with head motion of the driver, and the display is not to be stable, which may cause a passenger to feel uncomfortable.

An object of the present technology is to provide a driver with a visual field that is intuitive and easily viewable, and to stabilize display in a case where the driver is not carrying out looking operation.

Solutions to Problems

A concept of the present technology is
an image processing apparatus including:
a processing unit configured to obtain a display image to be displayed on a display unit in accordance with motion of a viewpoint of a driver, on the basis of a captured image obtained by capturing an image on a rear side from the vehicle, when a line-of-sight of the above-described driver is in a certain region including the above-described display unit.

In the present technology, when a line-of-sight of the driver is in a certain region including the display unit, the processing unit obtains a display image to be displayed on the display unit in accordance with motion of a viewpoint of the driver on the basis of a captured image obtained by capturing an image on a rear side from the vehicle. For example, the processing unit may be made to obtain the display image in accordance with a deviation of a viewpoint position of the driver from a reference viewpoint position. This configuration makes it possible to obtain a favorable display image according to the viewpoint motion.

As described above, in the present technology, when a line-of-sight of the driver is in a certain region including the display unit, the display image is obtained in accordance with motion of a viewpoint of the driver on the basis of a captured image. Therefore, it is possible to provide a driver with a visual field that is intuitive and easily viewable, and to stabilize display in a case where the driver is not carrying out looking operation.

Note that, in the present technology, for example, the processing unit may be made to update the reference viewpoint position on the basis of a long-term fluctuation of the viewpoint position. Therefore, for example, an appropriate rear visual field can be obtained even if there is a long-term fluctuation of the viewpoint position due to a change in a posture of the driver.

In this case, for example, the processing unit may be made to average, for each fixed interval, the viewpoint position obtained at a predetermined sample rate, and sequentially obtain an update value of the reference viewpoint position. This configuration makes it possible to appropriately obtain the update value of the reference viewpoint position corresponding to the long-term fluctuation of the viewpoint position due to a change in a posture of the driver.

Furthermore, in this case, for example, the processing unit may be made not to update the reference viewpoint position when a line-of-sight of the driver is in a certain region including the display unit that displays the display image. In this case, since a display view angle of a rear video image changes accurately in response to a viewpoint fluctuation of the driver, it is possible to accurately provide a visual field that is intuitive and easily viewable.

Furthermore, the present technology may further include a registration unit configured to register, as an initial reference viewpoint position, a viewpoint position of the driver in a case where a line-of-sight of the driver is continuously present for a certain period of time on the display unit that displays a display image, for example, when a viewpoint position of the driver enters a certain region corresponding to a seated state. Registering the initial reference viewpoint position in this way makes it possible to provide an appropriate rear visual field to the driver from the beginning of driving, even in a case where the driver is changed.

Furthermore, in the present technology, for example, the processing unit may be made to superimpose an image showing the vehicle on the captured image, to obtain the display image. In this case, since the display image is not only made from the captured image obtained by capturing an image on a rear side from the vehicle, but the display image is obtained by superimposing the image showing the vehicle on the captured image, it is possible to easily provide a sense of distance by motion parallax.

In this case, for example, the image showing the vehicle may be a computer graphics image. Using a computer graphics image allows a higher degree of freedom in generating an image showing the vehicle.

Furthermore, for example, the captured image obtained by capturing an image on a rear side from the vehicle may be a captured image captured by an image capturing device attached to a rear part of the vehicle, and the image showing the vehicle may be a vehicle interior image. In this case, the display image corresponds to room mirror display. Furthermore, for example, the captured image obtained by capturing an image on a rear side from the vehicle may include a captured image captured by an image capturing device attached to a side part of the vehicle, and the image showing the vehicle may be a vehicle body image. In this case, the display image corresponds to side mirror display.

Furthermore, for example, the processing unit may be made to change a superimposed positional relationship between the captured image and the image showing the vehicle, in accordance with a deviation of a viewpoint position of the driver from a reference viewpoint position. This configuration can generate motion parallax that is close to that of looking at an actual rearview mirror, and can assist the driver's perception of between distances.

In this case, for example, the processing unit may be made to arrange the captured image and the image showing the vehicle in a three-dimensional space, obtain a virtual viewpoint position that changes in accordance with a deviation of a viewpoint position of the driver from a reference viewpoint position, and convert the captured image and the image showing the vehicle into a projected coordinate system with a visual field determined by the virtual viewpoint position, to obtain a display image. This configuration makes it possible to accurately change the superimposed positional relationship between the captured image and the image showing the vehicle, in accordance with motion of a viewpoint of the driver.

Then, in this case, for example, the processing unit may be made to arrange the captured image at a position of a predetermined object existing on a rear side from the vehicle. For example, the predetermined object may be an object closest to the vehicle, or an object being seen by the driver. By arranging the captured image at a position of the predetermined object existing on a rear side from the vehicle in this way, a predetermined object can be arranged with a proper size at a proper position in the three-dimensional space, and the motion parallax that occurs between the predetermined object and the image showing the vehicle can be correctly expressed.

Furthermore, for example, the processing unit may be made to superimpose the image showing the vehicle on the captured image to allow the captured image to be seen through. This configuration can prevent impairment of rear visibility even when motion parallax is provided by superimposing the image showing the vehicle.

MODE FOR CARRYING OUT THE INVENTION

Hereinafter, an embodiment for implementing the invention (hereinafter, referred to as an embodiment) will be described. Note that the description will be given in the following order.

1. Embodiment
2. Modified Example

1. Embodiment

[Component Arrangement of Vehicle]

Figure 1:
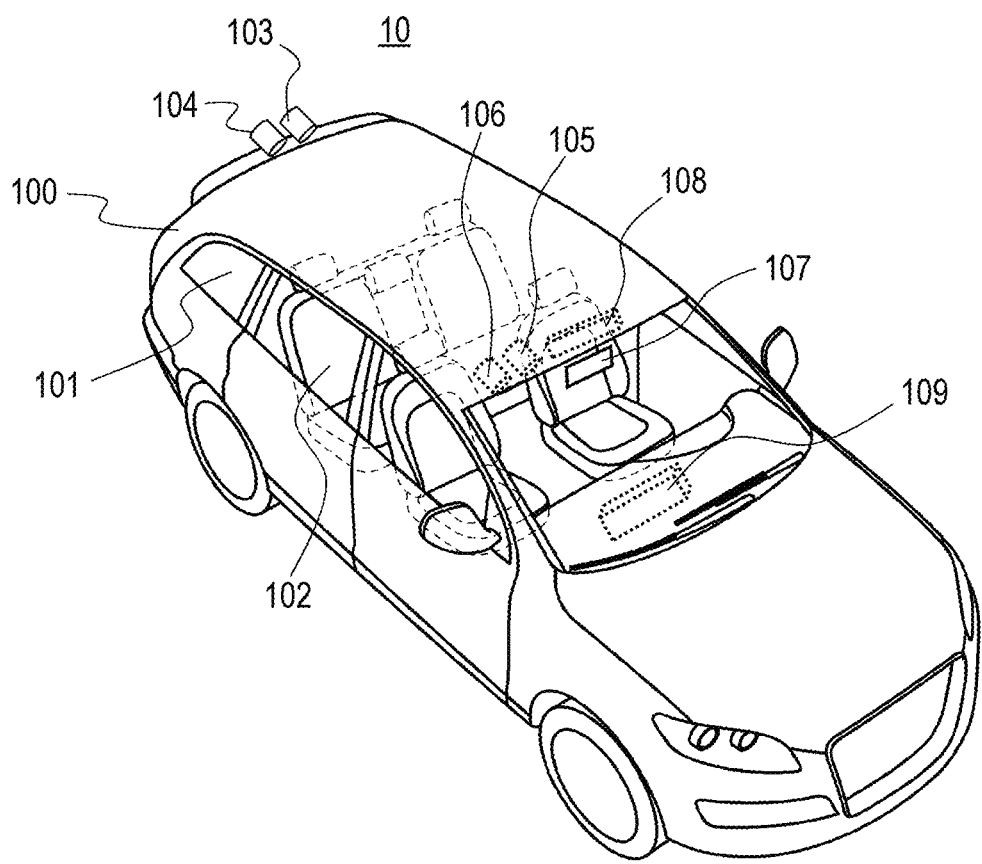
FIG. 1 is a view showing an example of component arrangement of a vehicle as an embodiment.
Figure 2:
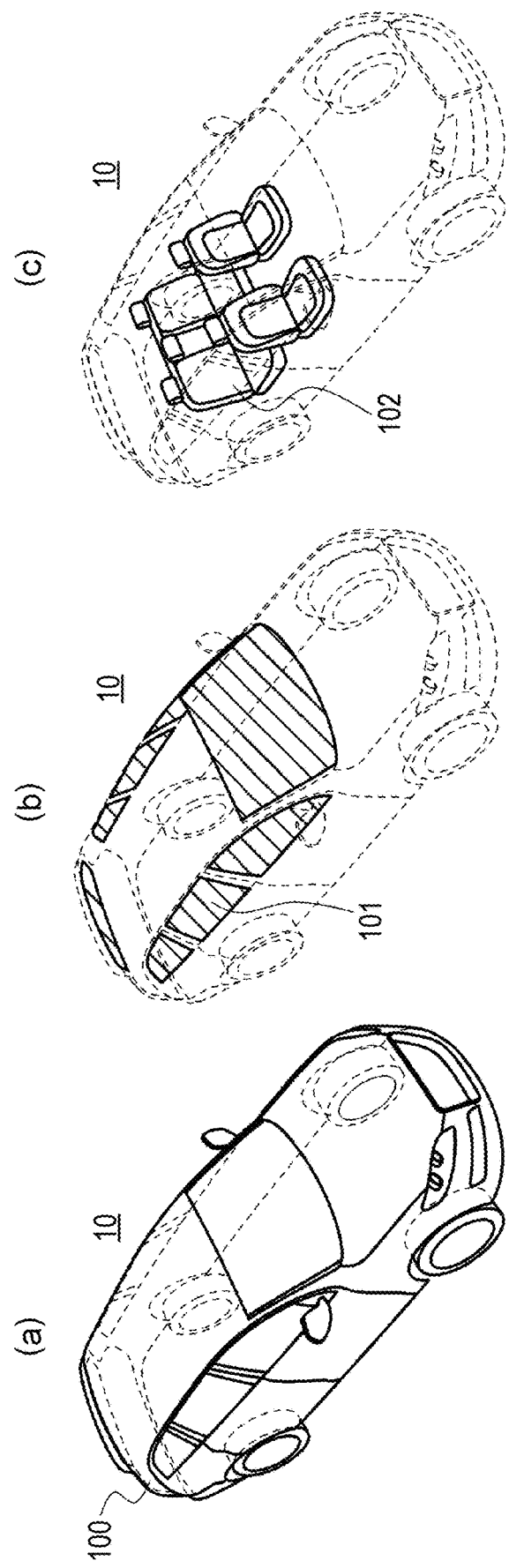
FIG. 2 is a view showing a vehicle body (a car body), a vehicle body opening (a window), and interior objects of a vehicle.

FIG. 1 shows an example of component arrangement of a vehicle 10 as an embodiment. The vehicle 10 has a vehicle body (a car body) 100, a vehicle body opening (a window) 101, and an interior object 102 such as a seat. FIG. 2(a) shows the vehicle body (the car body) 100, a hatched portion of FIG. 2(b) shows the vehicle body opening (the window) 101, and FIG. 2(c) shows the interior object 102 such as a seat.

Furthermore, the vehicle 10 has a rear image capturing unit 103, a rear distance measuring unit 104, a viewpoint measuring unit 105, and a line-of-sight measuring unit 106. The rear image capturing unit 103 is configured by, for example, a complementary metal oxide semiconductor (CMOS) camera, and is attached to a rear-side outer shell of the vehicle 10 so as to capture an image on a rear side. The rear distance measuring unit 104 is configured by, for example, a time of flight (ToF) distance image sensor, and is attached to the rear-side outer shell of the vehicle 10 so as to acquire a rear distance image.

The viewpoint measuring unit 105 detects a viewpoint position of a driver (a user). The viewpoint measuring unit 105 is attached inside on a front side of the vehicle 10. The viewpoint measuring unit 105 includes, for example, a CMOS camera, and measures a position of the driver's eye as the viewpoint position on the basis of a captured image of the camera. Note that the viewpoint measuring unit 105 may measure the viewpoint position of the driver on the basis of, for example, an image captured by an infrared camera. The line-of-sight measuring unit 106 detects a line-of-sight of the driver. The line-of-sight measuring unit 106 is attached inside on a front side of the vehicle 10. The line-of-sight measuring unit 106 includes, for example, a CMOS camera, and detects a line-of-sight of the driver, that is, where the driver is looking, on the basis of an image of the driver's pupil.

Furthermore, the vehicle 10 has a video image display unit (a display) 107, a user operation unit 108, and an image processing apparatus 109. The video image display unit 107 is attached inside on a front side of the vehicle 10 instead of a conventional room mirror, and has a substantially rectangular display surface. The video image display unit 107 includes a liquid crystal display (LCD), an organic electronic luminescent (EL) panel, and the like.

The user operation unit 108 constitutes a user interface that receives various operations by the driver. This user operation unit 108 includes, for example, a mechanical operation button arranged on an in-front panel, and further includes a touch panel arranged on a screen of the video image display unit 107, and the like. The video image display unit 107 basically displays a rear image of the vehicle 10. However, in a case where a touch panel function is provided, the video image display unit 107 also displays a user interface (UI) for user operation, if necessary.

The image processing apparatus 109 performs processing for obtaining a display image to be displayed on the video image display unit 107. The image processing apparatus 109 is arranged at any location inside the vehicle 10, for example, in an in-front panel part as illustrated. The image processing apparatus 109 obtains a display image in accordance with a deviation of a viewpoint position of the driver from a reference viewpoint position, on the basis of a camera image obtained by the rear image capturing unit 103. Then, in this case, the image processing apparatus 109 updates the reference viewpoint position on the basis of a long-term fluctuation of the viewpoint position. This configuration makes it possible to provide a visual field that is intuitive and easily viewable, and to obtain an appropriate rear visual field even if a posture of the driver changes.

In this case, the image processing apparatus 109 is not to update the reference viewpoint position when a line-of-sight of the driver is in a certain region including the display unit that displays a display image. This configuration causes a display view angle of a rear video image to be changed accurately in response to a viewpoint fluctuation of the driver, which makes it possible to accurately provide a visual field that is intuitive and easily viewable.

Furthermore, in this case, when a viewpoint position of the driver enters a certain region corresponding to a seated state, the image processing apparatus 109 registers, as an initial reference viewpoint position, a viewpoint position of the driver in a case where a line-of-sight of the driver is continuously present for a certain period of time on the display unit that displays a display image. This configuration makes it possible to provide an appropriate rear visual field to the driver from the beginning of driving, even in a case where the driver is changed.

Furthermore, in this case, the image processing apparatus 109 obtains a display image by superimposing and composing, with 3D CG, a vehicle interior image (a seat, a headrest, a window, a pillar, and the like) as an image showing the vehicle 10, on a camera image obtained by the rear image capturing unit 103. In this case, the display image is not made only with the camera image, but the display image is obtained by superimposing the vehicle interior image on the camera image. Therefore, it is possible to easily provide a sense of distance by motion parallax.

In this case, the image processing apparatus 109 changes a superimposed positional relationship between the captured image and the vehicle interior image, in accordance with a deviation of a viewpoint position of the driver obtained by the viewpoint measuring unit 105 from a reference viewpoint position. This configuration allows the driver to have motion parallax that is close to that of looking at an actual room mirror, and can assist the driver's perception of between distances.

[Configuration of Image Processing Apparatus]

Figure 3:
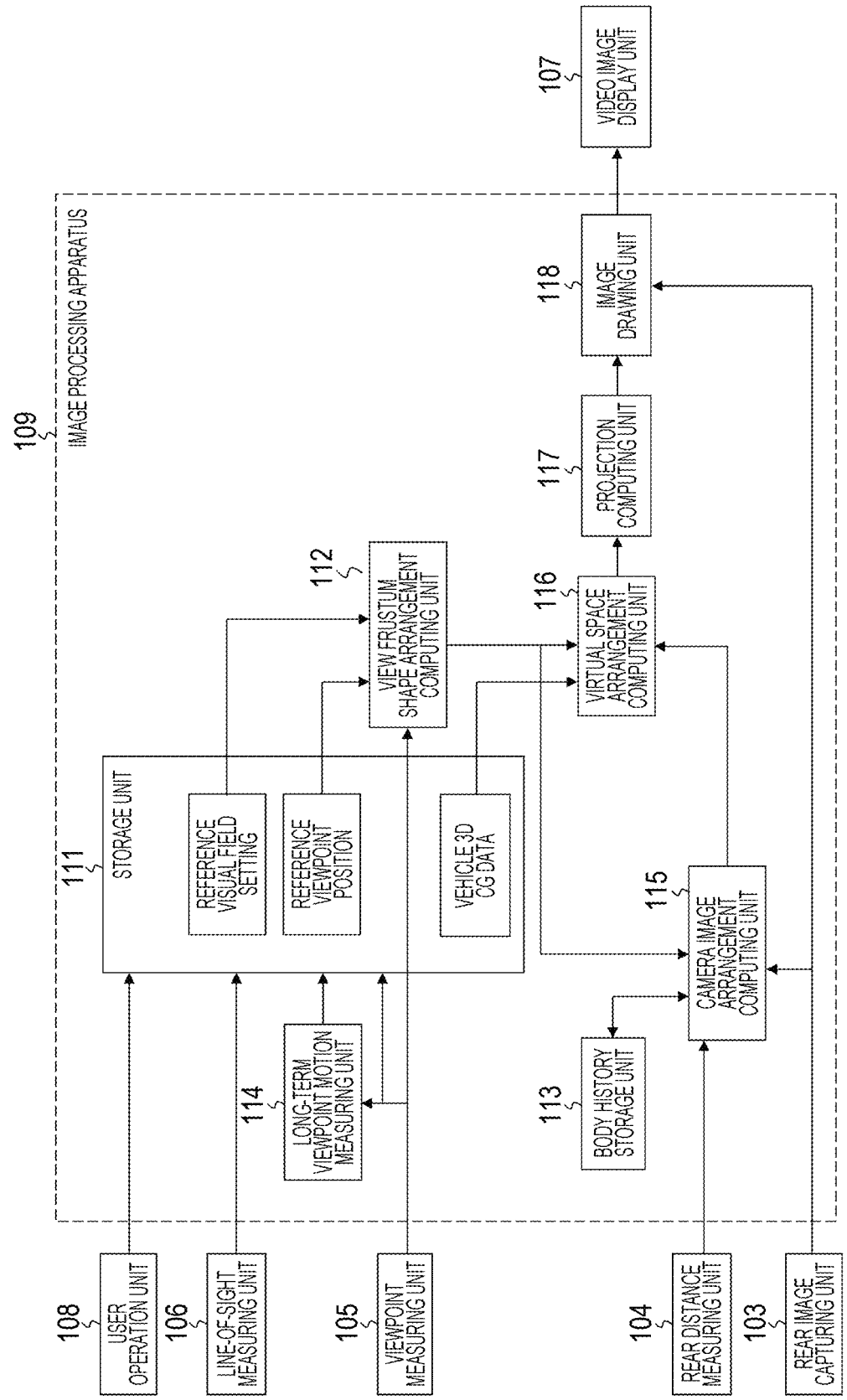
FIG. 3 is a block diagram showing a configuration example of an image processing apparatus.

FIG. 3 shows a configuration example of the image processing apparatus 109. The image processing apparatus 109 includes a storage unit 111, a view frustum shape position computing unit 112, a body history storage unit 113, a long-term viewpoint motion measuring unit 114, a camera image arrangement computing unit 115, a virtual space arrangement computing unit 116, a projection computing unit 117, and an image drawing unit 118.

Figure 4:
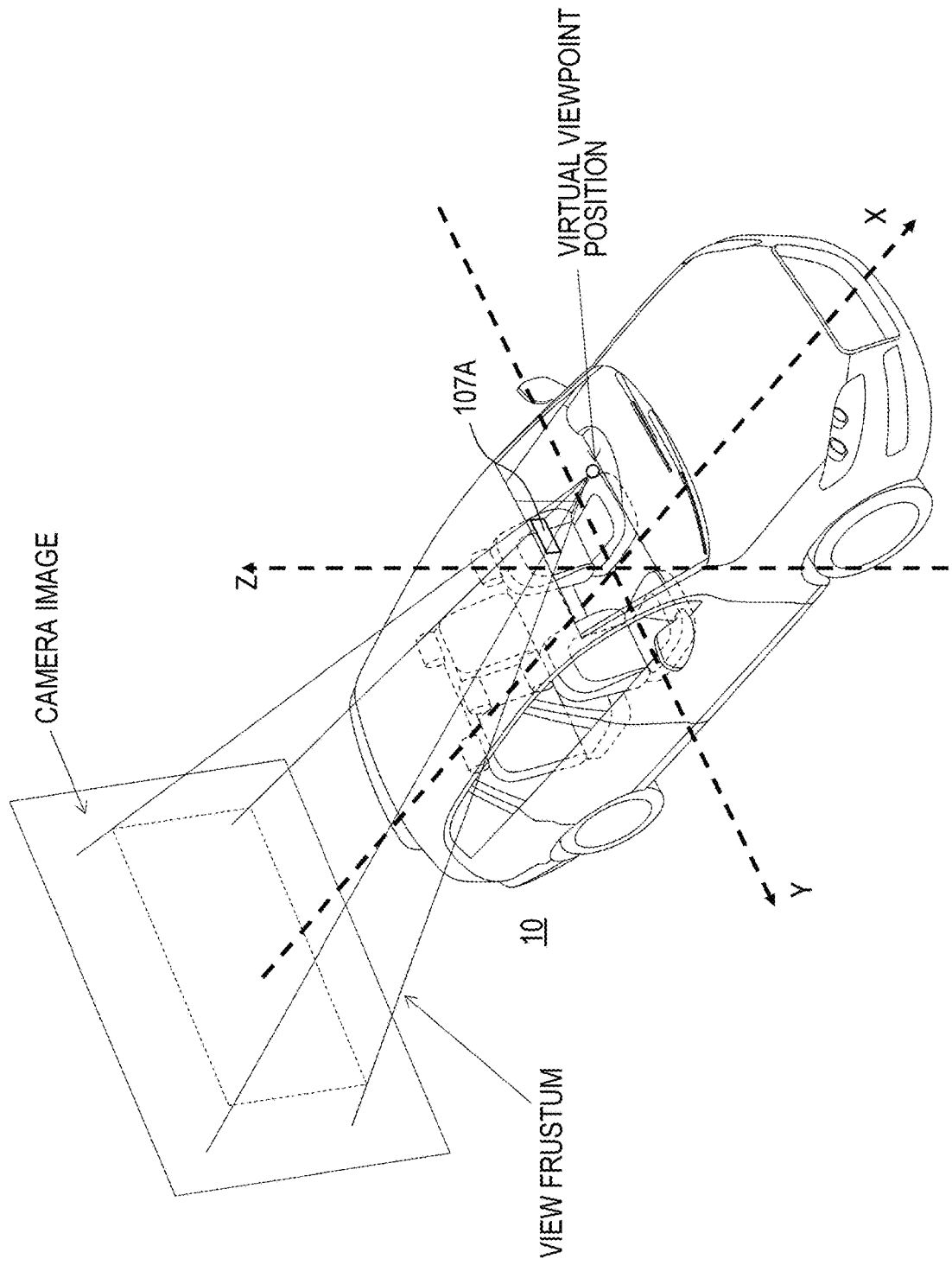
FIG. 4 is a view showing component arrangement in a virtual space.

As shown in FIG. 4, in addition to components to be subjected to image processing, that is, 3D CG data of the vehicle 10 (a car body, a window, an interior, and the like), the image processing apparatus 109 arranges, in a virtual space, a camera image obtained by capturing an image on a rear side, and places a view frustum obtained on the basis of a virtual viewpoint position and a virtual video image display unit 107A. Then, after performing enlargement/reduction processing, as necessary, the image processing apparatus 109 outputs an image generated with the view frustum as a display image to be displayed on the video image display unit 107. Note that, in a case where a size of the virtual video image display unit 107A is the same as that of the video image display unit 107, the enlargement/reduction processing is not required.

Figure 5:
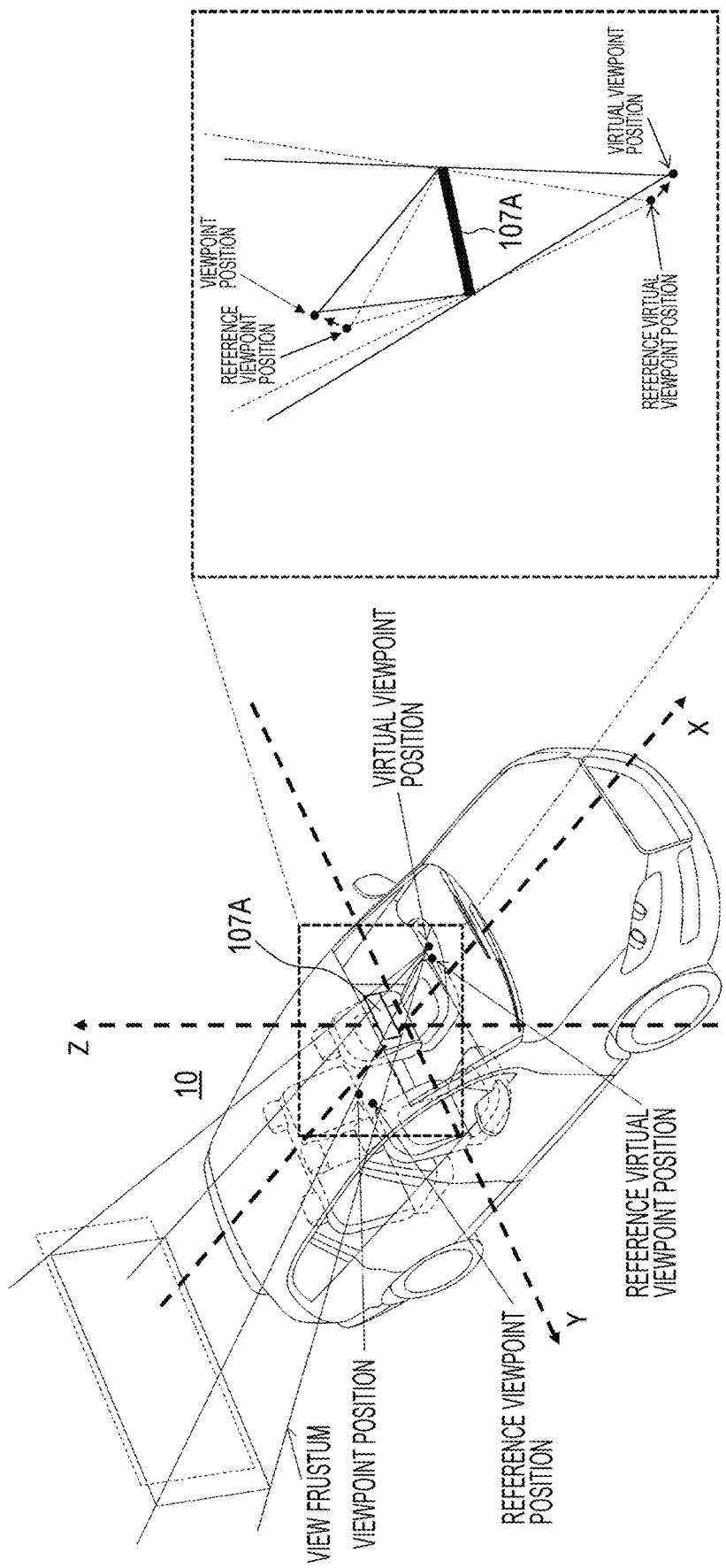
FIG. 5 is a view for explaining viewpoint motion and virtual viewpoint motion.

In this case, as shown in FIG. 5, the image processing apparatus 109 measures, as relative motion with respect to the reference viewpoint position, movement of a viewpoint position of the driver measured by the viewpoint measuring unit 105. In corresponding to this, the image processing apparatus 109 moves the virtual viewpoint position from a reference virtual viewpoint position, to change an image (a video image) displayed on the virtual video image display unit 107A and therefore the video image display unit 107, and provides the driver with appropriate motion parallax.

Returning to FIG. 3, the storage unit 111 stores information regarding the reference viewpoint position and a reference visual field setting, as well as the 3D CG data of the vehicle. Here, the reference visual field is a reference rear visual field, and means a visual field with the view frustum formed by the virtual viewpoint position and the virtual video image display unit 107A. Therefore, the information regarding the reference visual field setting is the information regarding the reference virtual viewpoint position and a position and a size of the virtual video image display unit 107A.

Figure 6:
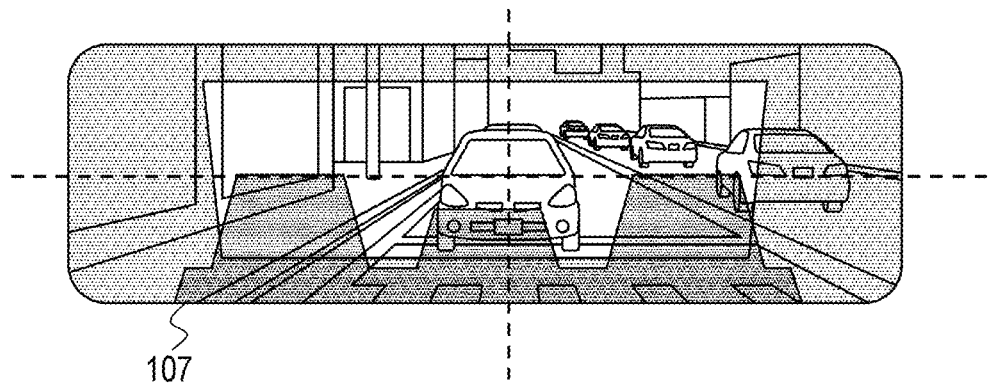
FIG. 6 is a view showing an example of appearance in an electronic mirror with a reference visual field.

A preferred rear visual field as the reference visual field varies depending on a driving situation and individuals, but a visual field in which top, bottom, left, and right are reflected in a well-balanced manner and a vanishing point is slightly above a center of the screen is considered as a general reference visual field. FIG. 6 shows an example of a rear visual field that is preferable as the reference visual field. In this example, the vanishing point is slightly above a center of the screen in a state of traveling on a straight horizontal road. Note that, in FIG. 6, an intersection point of broken lines extending in a vertical direction and a horizontal direction represents the center of the screen.

The image processing apparatus 109 executes an initialization flow after the driver (the user) is seated in the driver's seat, and automatically registers an appropriate reference viewpoint position for the driver in the storage unit 111. The reference viewpoint position registered in this initialization flow is the initial reference viewpoint position. By registering the initial reference viewpoint position in this way, it is possible to absorb individual differences in a viewpoint position that should be a reference for the driver. Further, it becomes possible to provide an appropriate rear visual field to the driver from the beginning of driving, even in a case where the driver is changed. In this embodiment, the reference viewpoint position is sequentially updated from the initial reference viewpoint position on the basis of a long-term fluctuation of the viewpoint position as described later.

Figure 7:
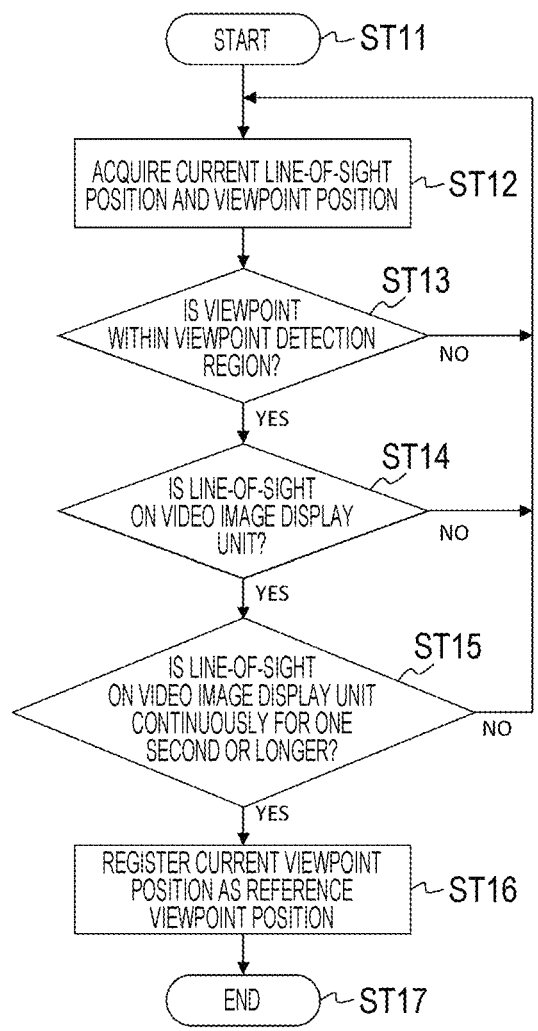
FIG. 7 is a flowchart showing an example of an initialization flow.

A flowchart of FIG. 7 shows an example of the initialization flow. In step ST11, the image processing apparatus 109 starts processing. Next, in step ST12, the image processing apparatus 109 acquires a current viewpoint position of the driver on the basis of a detection result of the viewpoint measuring unit 105, and also acquires a current line-of-sight position of the driver on the basis of a detection result of the line-of-sight measuring unit 106.

Figure 8:
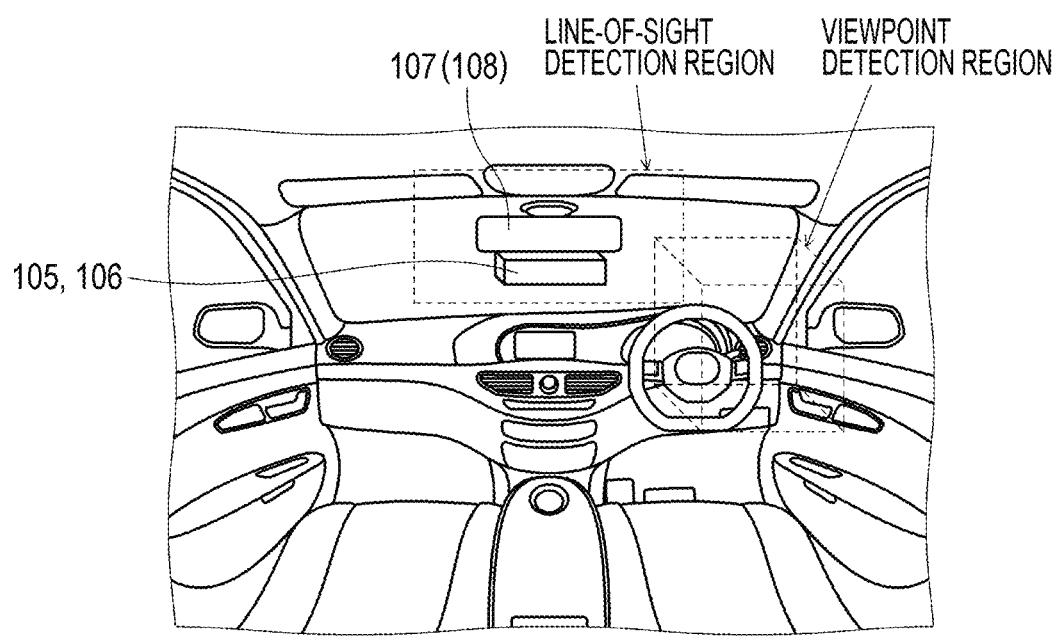
FIG. 8 is a view showing an example of a viewpoint detection region and a line-of-sight detection region.

Next, in step ST13, the image processing apparatus 109 determines whether or not the viewpoint is within a viewpoint detection region (see FIG. 8). Here, the viewpoint detection region is set in advance so as to include a viewpoint of the driver in a state of being seated in the driver's seat. Therefore, the fact that a viewpoint of the driver is within this viewpoint detection region can be regarded as the driver sitting in the driver's seat.

When the viewpoint is not within the viewpoint detection region, the image processing apparatus 109 returns to the processing of step ST12. Whereas, when the viewpoint is within the viewpoint detection region, the image processing apparatus 109 determines in step ST14 whether or not the line-of-sight is on the video image display unit 107 in a line-of-sight detection region (see FIG. 8). Here, the line-of-sight detection region is set in advance in a region including the video image display unit 107 and a peripheral thereof.

When the line-of-sight is not on the video image display unit 107, the image processing apparatus 109 returns to the processing of step ST12. Whereas, when the line-of-sight is on the video image display unit 107, the image processing apparatus 109 shifts to the processing of step ST15. In step ST15, the image processing apparatus 109 determines whether or not the line-of-sight is continuously present on the video image display unit 107 for a certain period of time or longer, here for one second or longer.

When the line-of-sight is not on the video image display unit 107 continuously present for one second or longer, the image processing apparatus 109 returns to the processing of step ST12. Whereas, when the line-of-sight is continuously present for one second or longer on the video image display unit 107, the image processing apparatus 109 registers the current viewpoint position as the reference viewpoint position in the storage unit 111 in step ST16. Thereafter, in step ST17, the image processing apparatus 109 ends a series of processing.

The registration of the reference visual field setting can be executed by the driver performing a touch operation on the user operation unit 108, for example, the touch panel arranged on the screen, of the video image display unit 107. In this case, a visual field setting (a virtual viewpoint position, and the like) is adjusted to obtain desired appearance of the rear visual field at the reference viewpoint position, and the adjusted visual field setting is registered in the storage unit 111 as the reference visual field setting.

Figure 9:
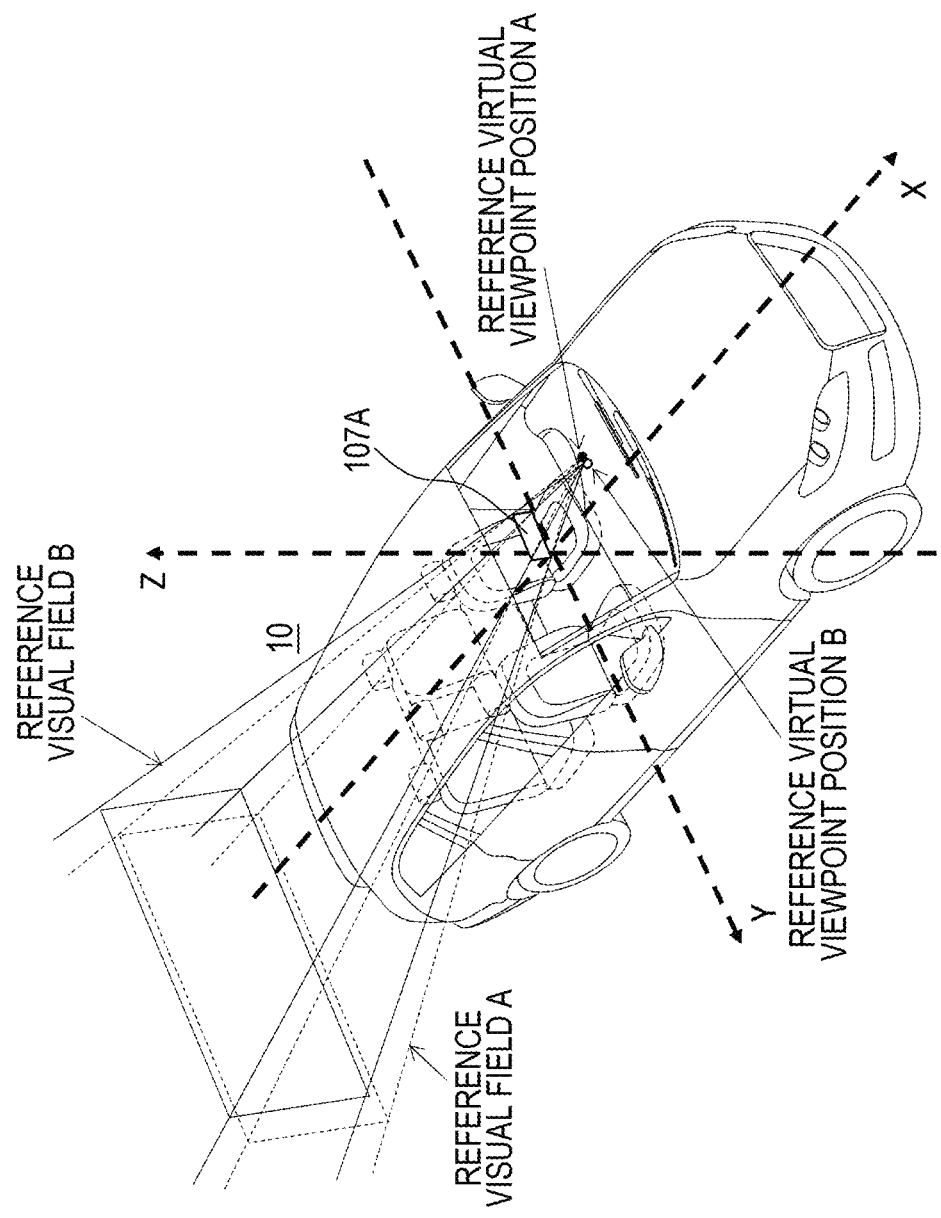
FIG. 9 is a view showing an example of adjustment of a visual field setting by a driver.
Figure 9:
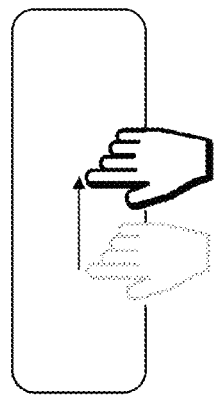

FIGS. 9(*a*) and 9(*b*) show an example of adjustment of the visual field setting by the driver. This example shows that, when the driver performs a slide operation in a right direction on the touch panel as shown in FIG. 9(*a*), movement is made from a virtual viewpoint position A to the virtual viewpoint position B as shown in FIG. 9(*b*), and a reference visual field A is changed to a reference visual field B.

Note that the driver seated in the driver's seat does not necessarily have to register the reference visual field setting. In a case where the reference visual field setting is not registered, the reference visual field setting already registered in the storage unit 111 is used as it is. Furthermore, it is also conceivable that the storage unit 111 holds a plurality of reference visual field settings and manually or automatically switches the plurality of reference visual field settings to use depending on a driving situation.

The information regarding the reference viewpoint position and the reference visual field setting stored (registered) in the storage unit 111 is used in a normal operation flow, but the reference viewpoint position will be updated sequentially on the basis of a long-term fluctuation of the viewpoint position. Therefore, it is possible to always obtain an appropriate rear visual field even if a posture of the driver changes.

Returning to FIG. 3, in the normal operation flow, the long-term viewpoint motion measuring unit 114 updates the reference viewpoint position stored in the storage unit 111 on the basis of a long-term fluctuation of the viewpoint position of the driver obtained by the viewpoint measuring unit 105. In this case, the long-term viewpoint motion measuring unit 114 averages, for each fixed movement average interval, the viewpoint position obtained at a predetermined sample rate, and sequentially obtains an update value of the reference viewpoint position.

Figure 10:
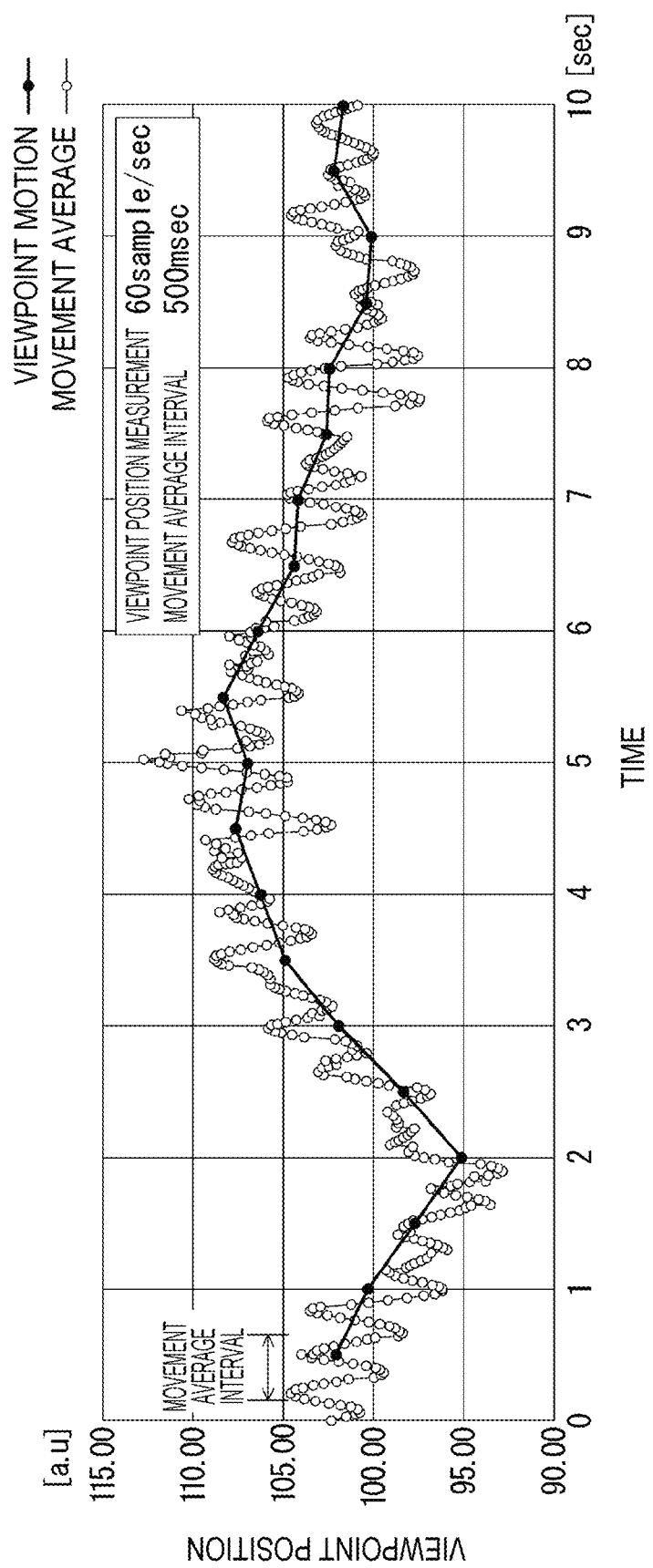
FIG. 10 is a view showing an example of viewpoint motion and a movement average.

FIG. 10 shows an example of viewpoint motion and a movement average, that is, the update value. The illustrated example shows a case where a sample rate of the viewpoint position is 60 sample/sec and a movement average interval is 500 msec. Furthermore, the illustrated example is for only one axis, but it is possible to follow a long-term fluctuation in the viewpoint position, such as a posture fluctuation, and always provide a favorable rear visual field by performing similar calculation in each of up-down, front-back, and left-right directions and adopting a movement average value as the reference viewpoint position. Note that the sample rate of the viewpoint position and the movement average interval are not limited to these values.

In this embodiment, the long-term viewpoint motion measuring unit 114 does not update the reference viewpoint position when a line-of-sight of the driver is within the line-of-sight detection region (see FIG. 8) including the video image display unit 107. This configuration causes a display view angle of a rear video image to be changed accurately in response to a viewpoint fluctuation of the driver, which makes it possible to accurately provide a visual field that is intuitive and easily viewable. Note that, it is also conceivable to update the reference viewpoint position regardless of whether or not line-of-sight of the driver is within the line-of-sight detection region including the video image display unit 107.

Returning to FIG. 3, the view frustum shape position computing unit 112 calculates a shape and a position of the view frustum in the virtual space, on the basis of information regarding the reference viewpoint position and the reference visual field setting read from the storage unit 111, and the current viewpoint position detected by the viewpoint measuring unit 105. In this case, a virtual viewpoint position (a current virtual viewpoint position) deviated from the reference virtual viewpoint position is obtained (see FIG. 5) in accordance with a deviation (a deviation in a distance or a direction) of the viewpoint position (the current viewpoint position) from the reference viewpoint position. Further, on the basis of this virtual viewpoint position and the size and the position of the virtual video image display unit 107A, a position and a shape of the view frustum with the virtual viewpoint as an apex are obtained (see FIG. 4).

The camera image arrangement computing unit 115 calculates an arrangement distance of a camera image in the virtual space, on the basis of a rear distance image acquired by the rear distance measuring unit 104, a rear camera image acquired by the rear image capturing unit 103, the shape and the position of the view frustum obtained by the view frustum shape arrangement computing unit 112, and the like. Depending on this arrangement position of the camera image, appearance (motion parallax) of a subject that is shown in the camera image and appears and disappears in a vehicle interior image (the car body, the window, the interior) differs when the driver moves the viewpoint position. In order to provide appropriate motion parallax, it is necessary to place the camera image at an appropriate position in the virtual space.

Figure 11:
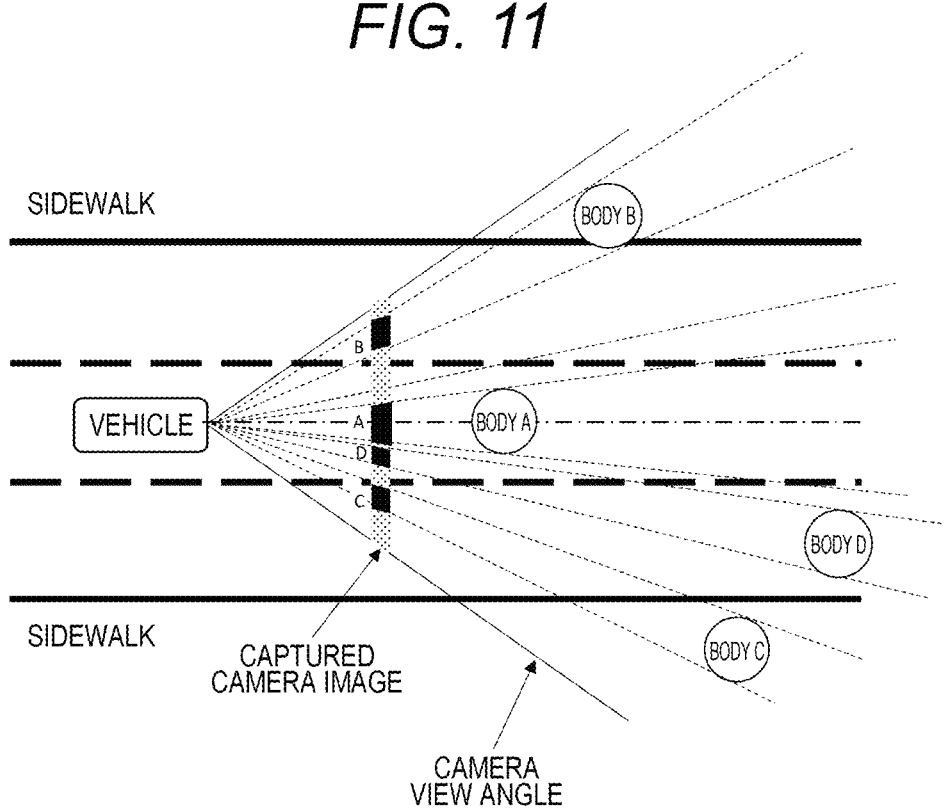
FIG. 11 is a view for explaining a captured camera image.

As shown in FIG. 11, an image actually captured by the camera is obtained by compressing a three-dimensional space in a distance direction, and bodies (objects) A to D at different distances are captured as a two-dimensional image in a size corresponding to the distance. Therefore, it is not perfectly appropriate by placing this camera image anywhere in a three-dimensional space, and a proper position can be obtained only for bodies that are at a distance where the camera image is placed. Note that, actually, an image outside a depth of field of a camera lens is blurred, but here, it is considered as an ideal pan-focus camera.

Figure 12:
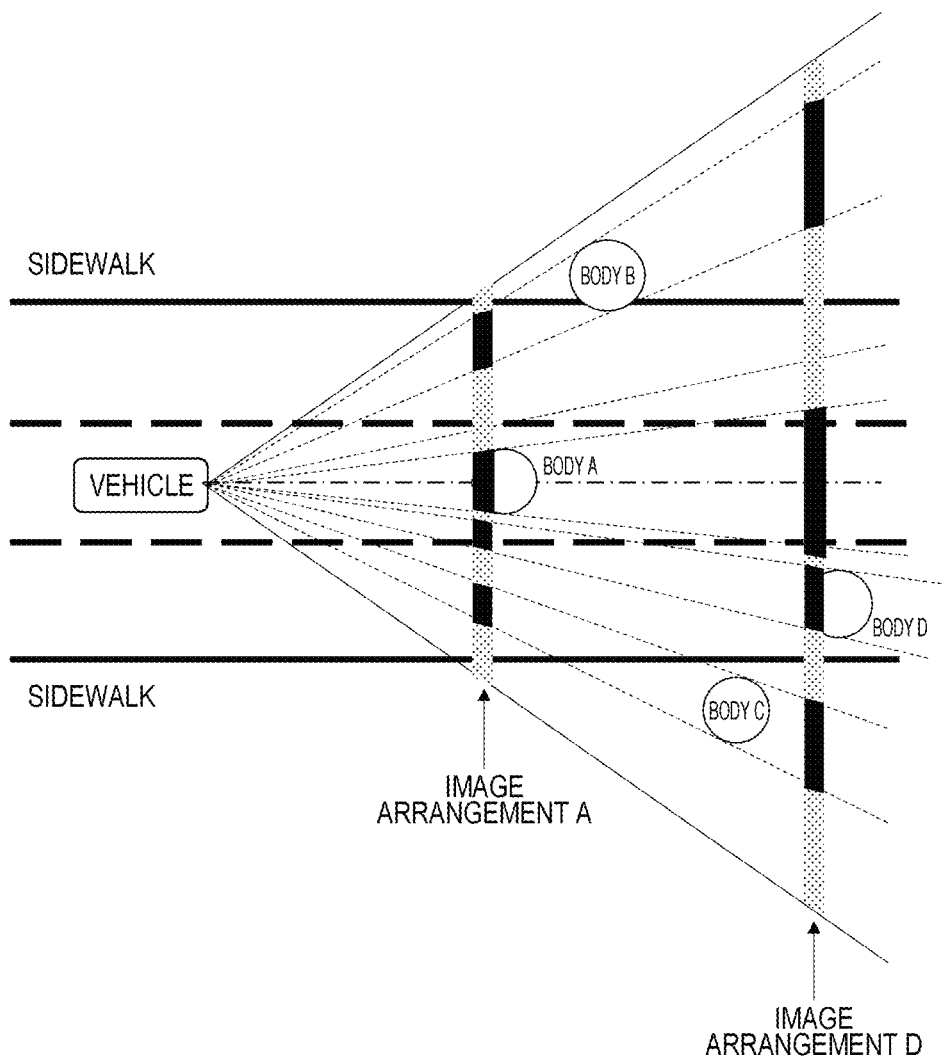
FIG. 12 is a view showing an arrangement example of a camera image.

FIG. 12 shows a case where the camera image is placed at a distance of the body A (image arrangement A) and a case where the camera image is placed at a distance of the body D (image arrangement D). Then, FIGS. 13(a), 13(b), and 13(c) show a sight in a case where a visual field (corresponding to a view frustum determined by the virtual viewpoint position) is moved to the right, the center, and the left, respectively.

Figure 13:
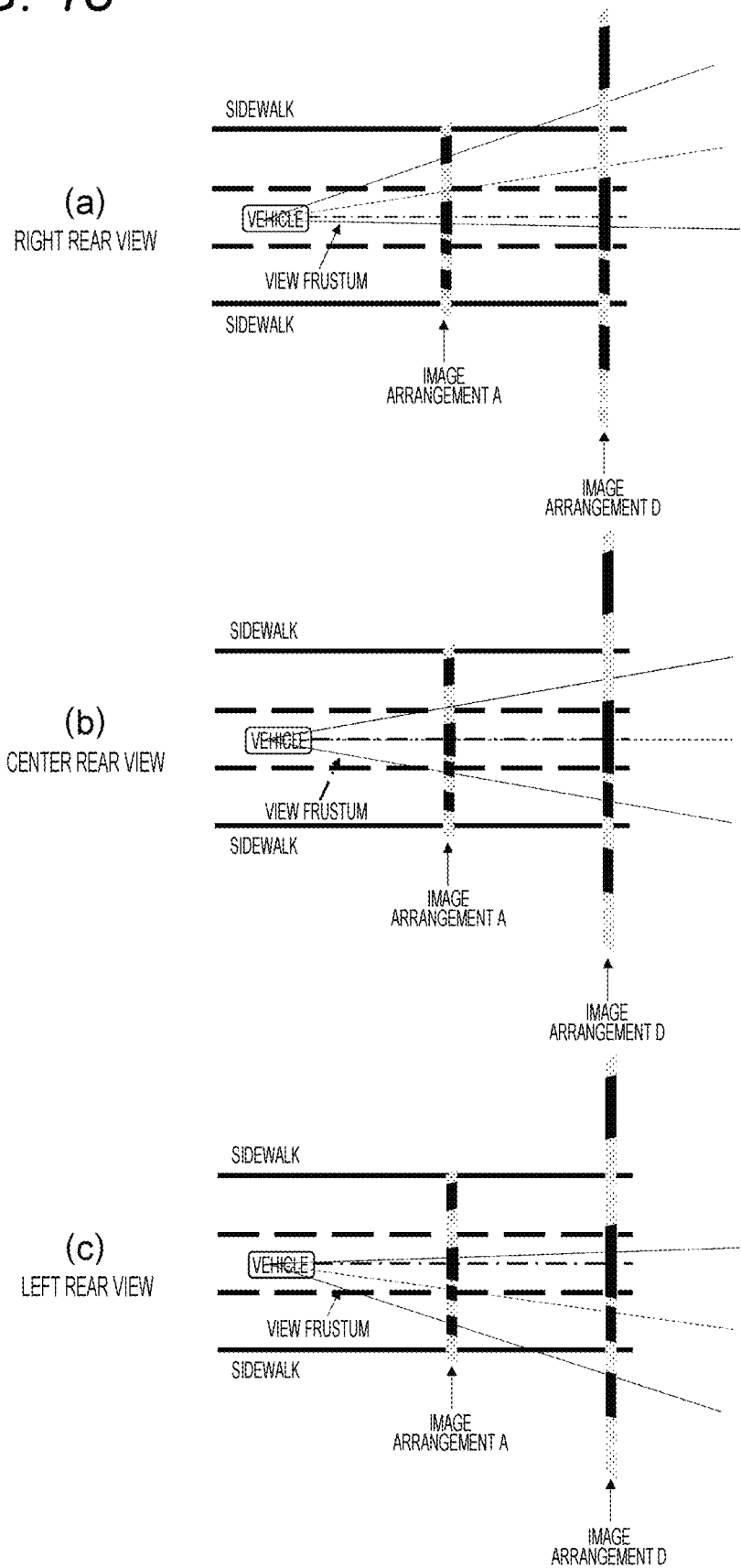
FIG. 13 is a view showing a change in appearance of a camera image due to a difference in arrangement of the camera image.

Comparing FIGS. 13(a), 13(b), and 13(c), a range of the camera image that enters the visual field differs between the case of image arrangement A and the case of image arrangement D. Further, it can be seen that a range of movement in the camera image differs in accordance with motion of the visual field. This is the motion parallax for a body in the camera image. By placing the camera image at a distance of a body (an object) of interest, the motion parallax that occurs between the body and the vehicle can be correctly expressed.

It should be noted that, for bodies other than the body of interest, a displayed size and motion parallax caused by the viewpoint motion are not correctly expressed. In order to provide proper motion parallax for all bodies, it is necessary to capture an image on a rear side in 3D, and separate all bodies to place in the virtual space. However, such processing requires a great deal of calculation power.

The present technology has a feature of providing motion parallax for the body of interest with a relatively small amount of calculation, by giving up the motion parallax other than the body of interest.

In order to present a useful sense of distance by the limited motion parallax, it is necessary to select a body of interest suitable for presenting the sense of distance to the driver. The followings are events to consider when selecting the body suitable for presenting a sense of distance.

(1) A distance between the vehicle and a body (a body closest to the vehicle).
(2) A change in distance between the vehicle and the body (whether it is approaching or moving away).
(3) A size of the body (It is not necessary to pay attention to bodies whose size is smaller than a certain level Ex. insects).
(4) What the body is (a car, a bicycle, a person, a wall, or a plant).
(5) A thing the driver is looking at (where the driver is looking).

Figure 14:
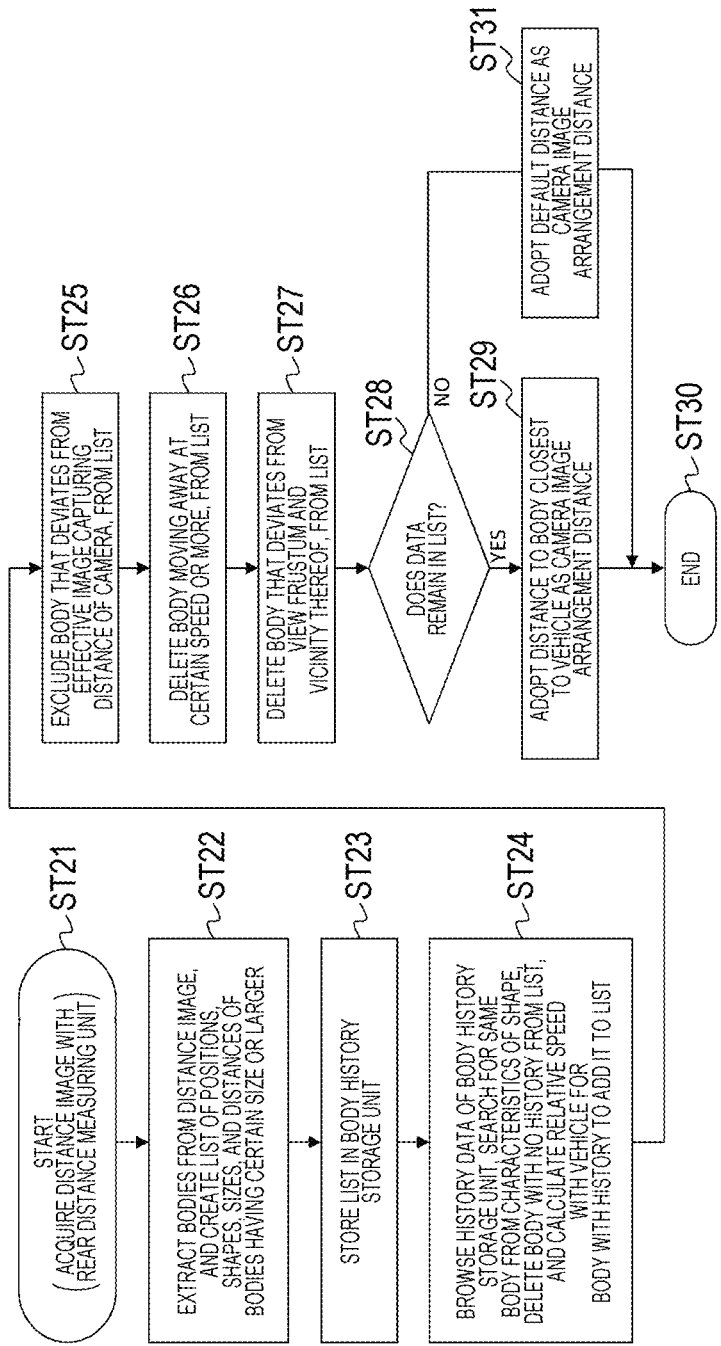
FIG. 14 is a flowchart showing an example of a processing flow of a camera image arrangement computing unit.

Ideally, comprehensive determination should be made in consideration of all of these, but it is possible to provide a useful system even with only some events. A flowchart of FIG. 14 shows an example of a processing flow of the camera image arrangement computing unit 115. This processing example takes into consideration of the above-mentioned events (1), (2), and (3), and can be realized by using only a distance image acquired by the rear distance measuring unit 104.

The camera image arrangement computing unit 115 executes the processing flow shown in the flowchart of FIG. 14 every time the rear distance measuring unit 104 acquires a distance image. Note that the rear distance measuring unit 104 acquires the distance image at a frequency of, for example, 120 fps.

In step ST21, the camera image arrangement computing unit 115 starts processing at a timing when the rear distance measuring unit 104 acquires the distance image. Next, in step ST22, the camera image arrangement computing unit 115 extracts bodies (object) from the distance image, and creates a list of positions, shapes, sizes, and distances of bodies having a certain size or larger. Then, in step ST23, the camera image arrangement computing unit 115 stores the created list in the body history storage unit 113.

Next, in step ST24, the camera image arrangement computing unit 115 browses history data of the body history storage unit 113, searches for the same body from the characteristics of the shape, deletes a body with no history from the list, and calculates a relative speed with the vehicle for a body with a history to add to the list.

Next, in step ST25, the camera image arrangement computing unit 115 excludes a body that deviates from an effective image capturing distance of the camera, from the created list. This is intended to remove bodies that are at a distance that the camera is out of focus. If the camera image cannot be captured even if the distance can be measured, the body is inappropriate for a camera image arrangement distance and is excluded.

Next, in step ST26, the camera image arrangement computing unit 115 deletes a body moving away at a certain speed or more, from the list. Next, in step ST27, the camera image arrangement computing unit 115 deletes a body that deviates from the view frustum and vicinity thereof, from the list. Then, in step ST28, the camera image arrangement computing unit 115 determines whether or not data remains in the list.

When data remains in the list, in step ST29, the camera image arrangement computing unit 115 adopts a distance to a body closest to the vehicle, as the camera image arrangement distance. After the processing in step ST29, the camera image arrangement computing unit 115 ends a series of processing in step ST30.

Furthermore, when no data remains in the list in step ST28, a predetermined default distance is adopted as the camera image arrangement distance in step ST31. Here, the default distance is a distance suitable for arranging a distant view. In presenting a sense of distance, it is desirable to be as far as computing power allows. However, in reality, for example, the default distance is determined with reference to the computing power of the rear distance measuring unit 104. For example, the default distance may be about 100 m for a light detection and ranging (LiDAR), and about 250 m for ToF sensor. After the processing in step ST31, the camera image arrangement computing unit 115 ends the series of processing in step ST30.

Figure 15:
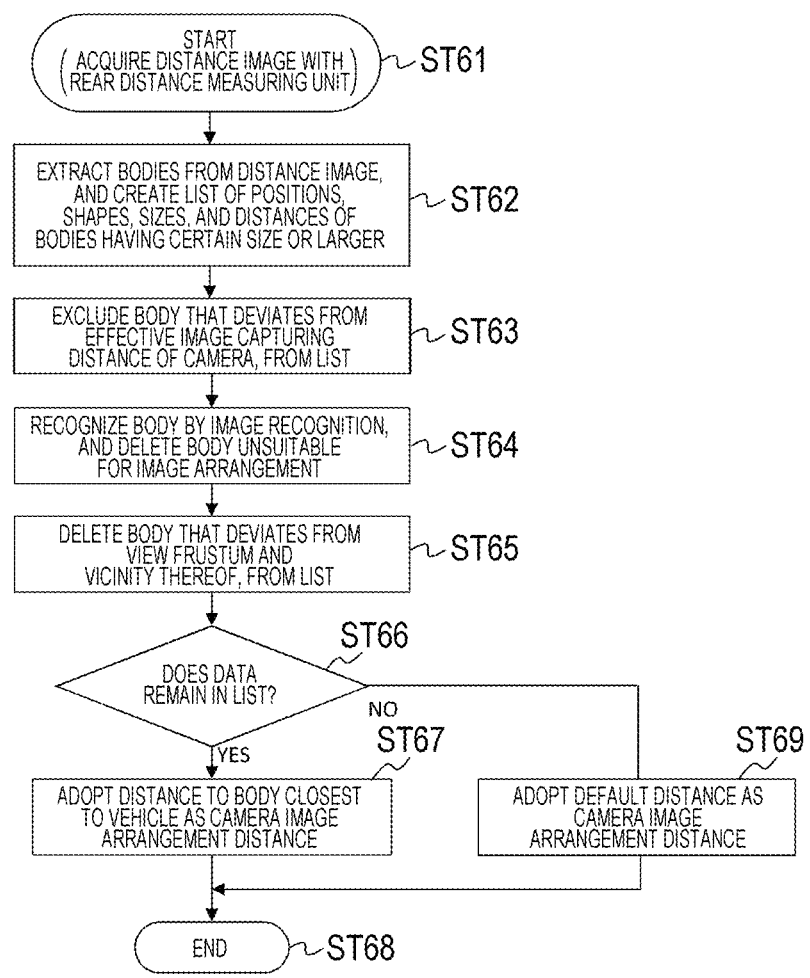
FIG. 15 is a flowchart showing another example of the processing flow of the camera image arrangement computing unit.

A flowchart of FIG. 15 shows another example of the processing flow of the camera image arrangement computing unit 115. This processing example takes into consideration of the above-mentioned events (1), (3), and (4), and can be realized by using a camera image obtained by the rear image capturing unit 103, in addition to a distance image acquired by the rear distance measuring unit 104.

The camera image arrangement computing unit 115 executes the processing flow shown in the flowchart of FIG. 15 every time the rear distance measuring unit 104 acquires a distance image. Note that the rear distance measuring unit 104 acquires the distance image at a frequency of, for example, 120 fps.

In step ST61, the camera image arrangement computing unit 115 starts processing at a timing when the rear distance measuring unit 104 acquires the distance image. Next, in step ST62, the camera image arrangement computing unit 115 extracts bodies from the distance image, and creates a list of positions, shapes, sizes, and distances of bodies having a certain size or larger.

Next, in step ST63, the camera image arrangement computing unit 115 excludes a body that deviates from an effective image capturing distance of the camera, from the created list. This is intended to remove bodies that are at a distance that the camera is out of focus. If the camera image cannot be captured even if the distance can be measured, the body is inappropriate for a camera image arrangement distance and is excluded.

Next, in step ST64, the camera image arrangement computing unit 115 recognizes a body by image recognition, and deletes a body unsuitable for image arrangement (for example, a bird, a dead leaf, and the like) from the list. Next, in step ST65, the camera image arrangement computing unit 115 deletes a body that deviates from the view frustum and vicinity thereof, from the list. Then, in step ST66, the camera image arrangement computing unit 115 determines whether or not data remains in the list.

When data remains in the list, in step ST67, the camera image arrangement computing unit 115 adopts a distance to a body closest to the vehicle, as the camera image arrangement distance. After the processing in step ST67, the camera image arrangement computing unit 115 ends a series of processing in step ST68.

Furthermore, when no data remains in the list in step ST66, a predetermined default distance (a distance suitable for arranging a distant view) is adopted as the camera image arrangement distance in step ST69. After the processing in step ST69, the camera image arrangement computing unit 115 ends the series of processing in step ST68.

Figure 16:
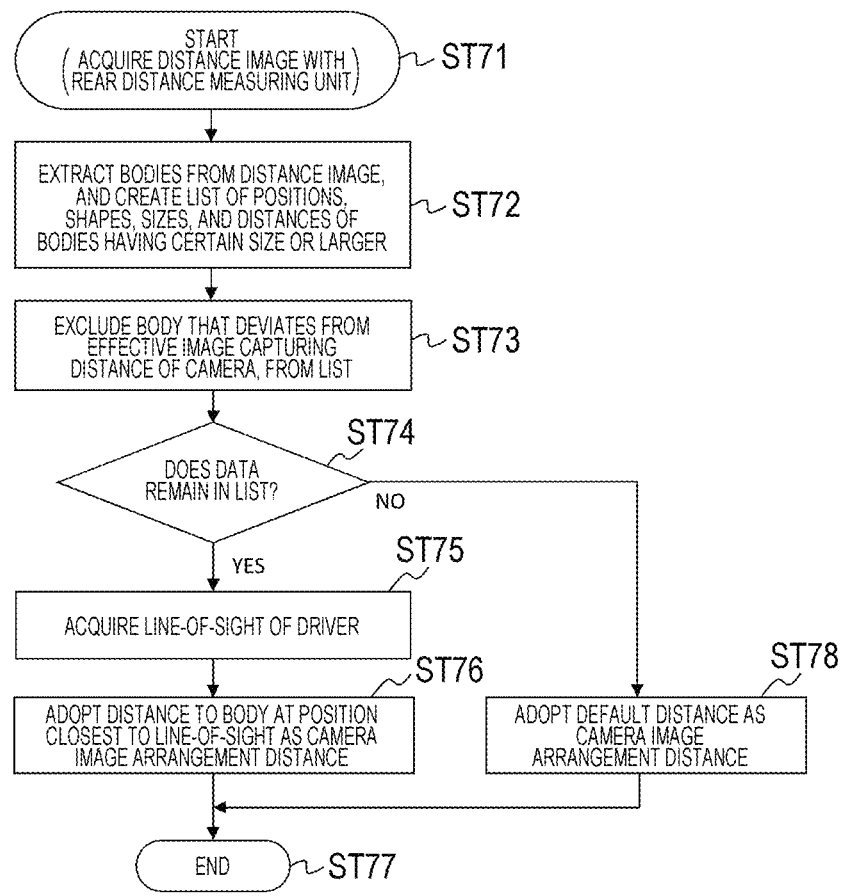
FIG. 16 is a flowchart showing another example of the processing flow of the camera image arrangement computing unit.

A flowchart of FIG. 16 shows still another example of the processing flow of the camera image arrangement computing unit 115. This processing example takes into consideration of the above-mentioned events (1), (3), and (5), and can be realized by using a line-of-sight detection result of the driver (the user) by the line-of-sight measuring unit 106, in addition to a distance image acquired by the rear distance measuring unit 104.

The camera image arrangement computing unit 115 executes the processing flow shown in the flowchart of FIG. 16 every time the rear distance measuring unit 104 acquires a distance image. Note that the rear distance measuring unit 104 acquires the distance image at a frequency of, for example, 120 fps.

In step ST71, the camera image arrangement computing unit 115 starts processing at a timing when the rear distance measuring unit 104 acquires the distance image. Next, in step ST72, the camera image arrangement computing unit 115 extracts bodies from the distance image, and creates a list of positions, shapes, sizes, and distances of bodies having a certain size or larger.

Next, in step ST73, the camera image arrangement computing unit 115 excludes a body that deviates from an effective image capturing distance of the camera, from the created list. Then, in step ST74, the camera image arrangement computing unit 115 determines whether or not data remains in the list.

When data remains in the list, in step ST75, the camera image arrangement computing unit 115 acquires a line-of-sight of the driver (the user) obtained by the line-of-sight measuring unit 106. Then, in step ST76, the camera image arrangement computing unit 115 adopts a distance of a body at a position closest to the line-of-sight, as the camera image arrangement distance. After the processing in step ST76, the camera image arrangement computing unit 115 ends a series of processing in step ST77.

Furthermore, when no data remains in the list in step ST74, a predetermined default distance (a distance suitable for arranging a distant view) is adopted as the camera image arrangement distance in step ST78. After the processing in step ST78, the camera image arrangement computing unit 115 ends the series of processing in step ST77.

Figure 17:
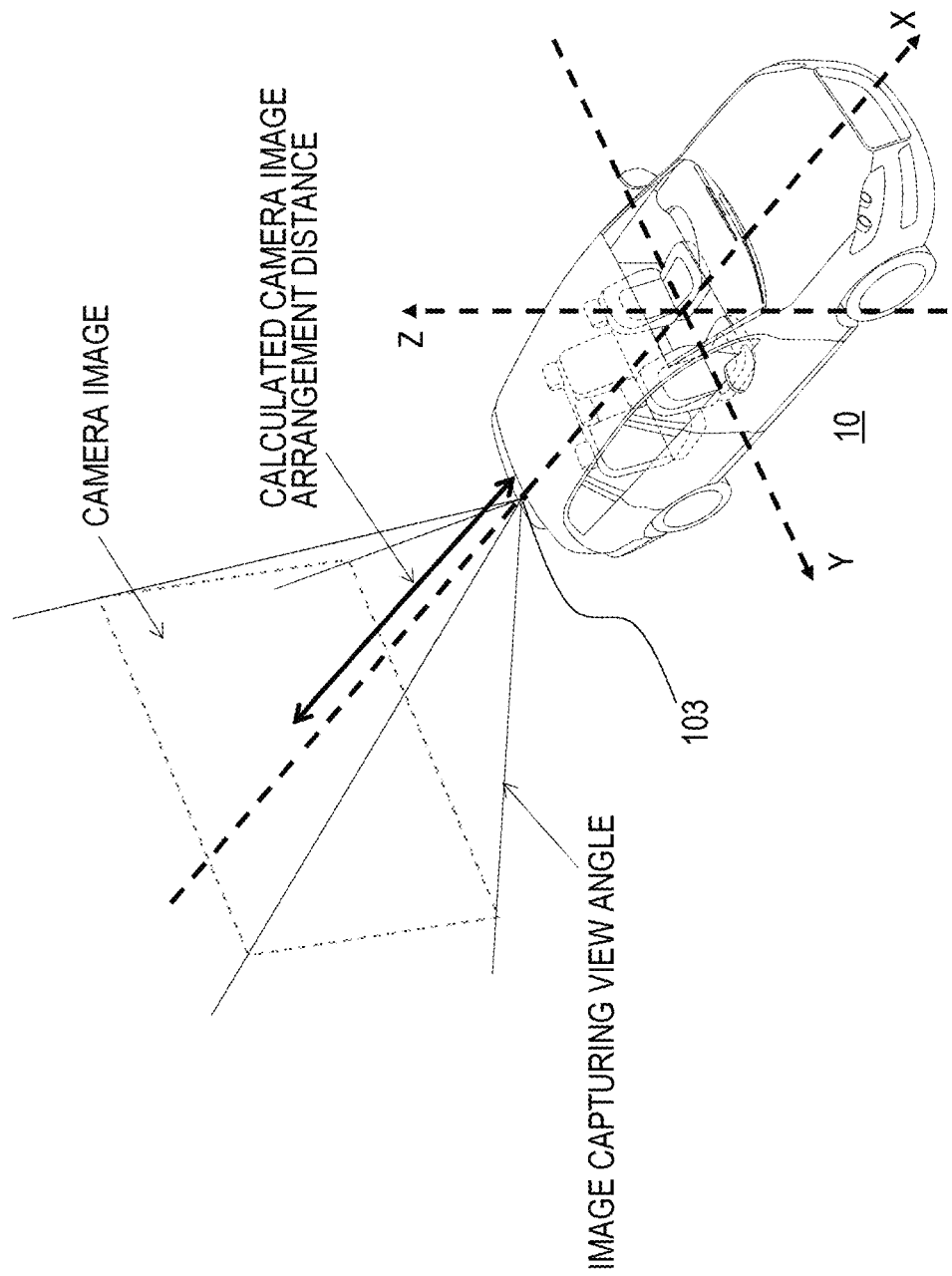
FIG. 17 is a view showing camera image arrangement in a virtual space.

FIG. 17 shows an arrangement position of a camera image in a virtual space. The camera image has been obtained by capturing with the rear image capturing unit 103, at a predetermined image capturing view angle. This camera image is arranged in the virtual space at a position separated from a rear part of the vehicle 10, by a camera image arrangement distance calculated by the camera image arrangement computing unit 115.

Figure 18:
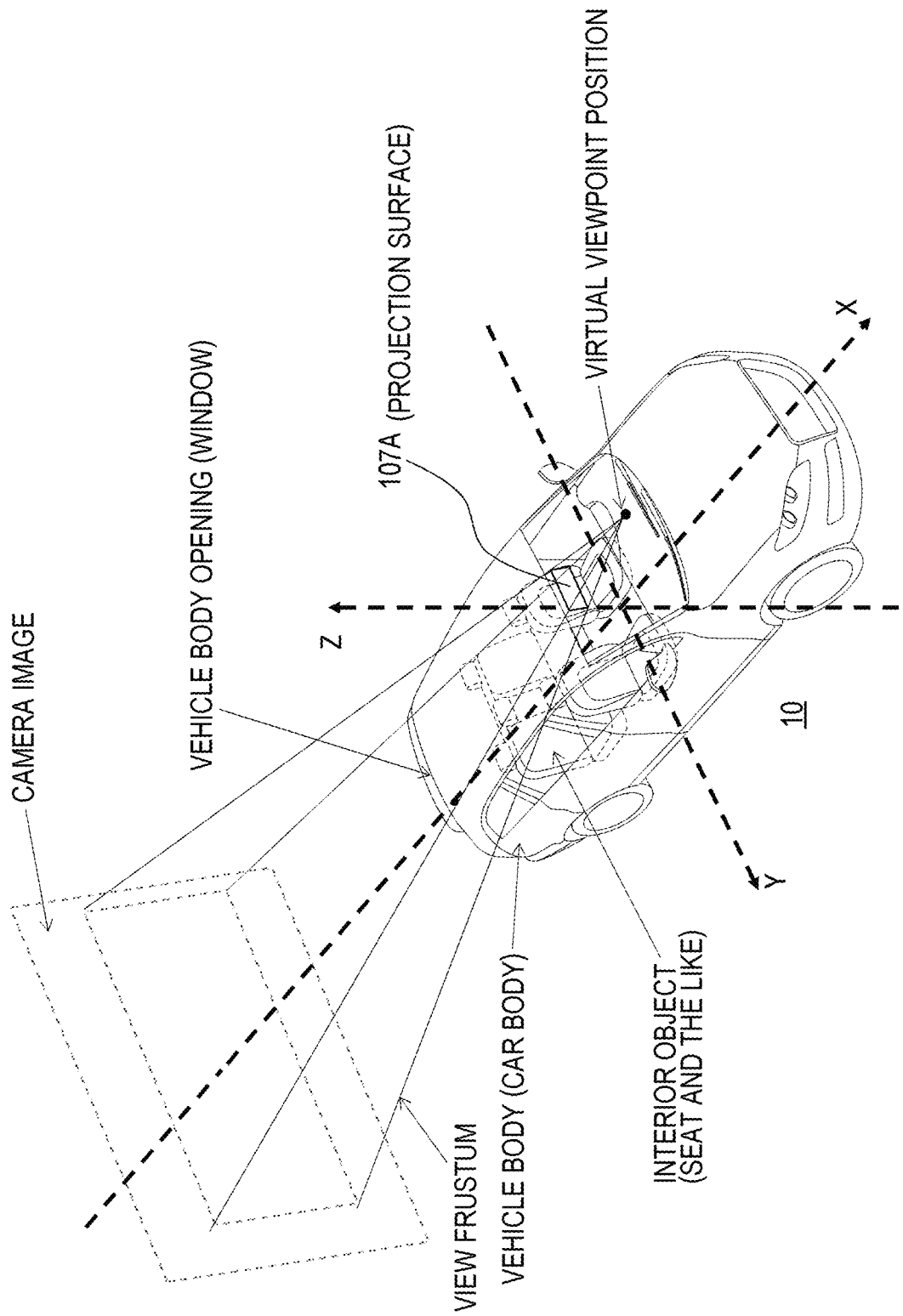
FIG. 18 is a view showing an arrangement example of elements necessary for drawing in a virtual space.

Returning to FIG. 3, the virtual space arrangement computing unit 116 arranges elements necessary for drawing in the virtual space. That is, the virtual space arrangement computing unit 116 arranges, in the virtual space, 3D CG data of the vehicle 10 (a car body, a window, an interior, and the like) stored in the storage unit 111. The virtual space arrangement computing unit 116 also arranges the camera image at a position of the camera image arrangement distance calculated by the camera image arrangement computing unit 115, and further arranges a view frustum on the basis of a shape and a position calculated by the view frustum shape arrangement computing unit 112. FIG. 18 shows an arrangement example of elements necessary for drawing in the virtual space.

Figure 19:
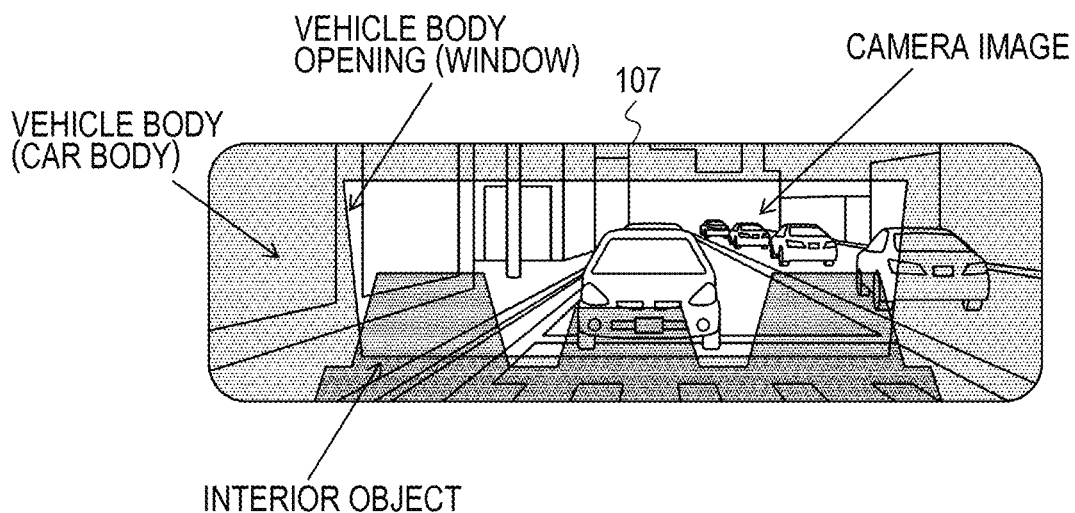
FIG. 19 is a view showing an example of a display image obtained by an image drawing unit.

The projection computing unit 117 converts an object in the virtual space into a projection image, with the virtual video image display unit 107A as a projection surface. The image drawing unit 118 performs processing for drawing details of the camera image and the 3D CG data on the projection image obtained by the projection computing unit 117. The image drawing unit 118 further performs enlargement/reduction processing for matching a size of an image to a size of the video image display unit 107, to output a display image to be supplied to the video image display unit 107. FIG. 19 shows an example of a display image obtained by the image drawing unit 118.

Figure 20:
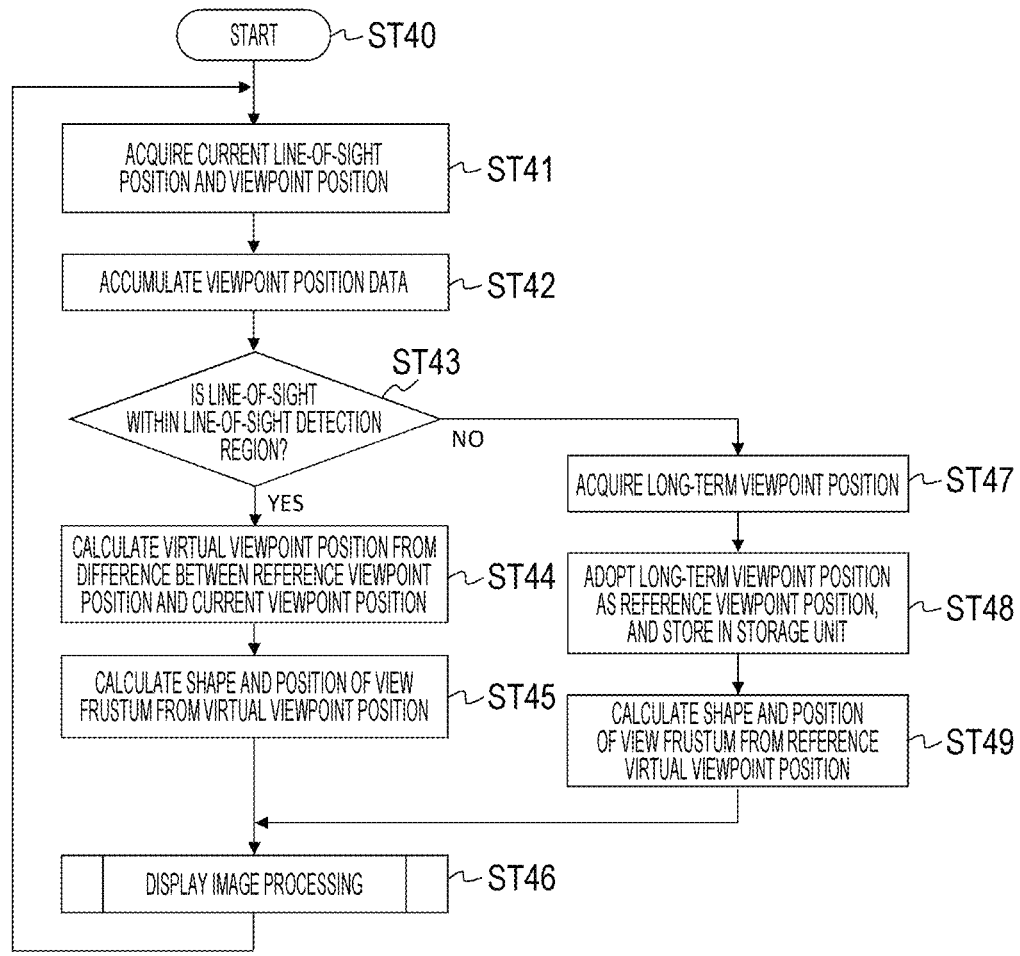
FIG. 20 is a flowchart showing an example of processing of the normal operation flow in the image processing apparatus.

A flowchart of FIG. 20 shows an example of processing of the normal operation flow in the image processing apparatus 109. The image processing apparatus 109 synchronizes the processing shown in the flowchart of FIG. 20 with a detection cycle, for example, ¹/₆₀ seconds, of a viewpoint and a line-of-sight in the viewpoint measuring unit 105 and the line-of-sight measuring unit 106, and executes the processing in that cycle.

In step ST40, the image processing apparatus 109 starts processing. Next, in step ST41, the image processing apparatus 109 acquires a current viewpoint position on the basis of a detection result of the viewpoint measuring unit 105, and also acquires a current line-of-sight position on the basis of a detection result of the line-of-sight measuring unit 106. Then, the image processing apparatus 109 accumulates viewpoint position data in step ST42.

Next, in step ST43, the image processing apparatus 109 determines whether or not the line-of-sight is within the line-of-sight detection region (see FIG. 8). When the line-of-sight is within the line-of-sight detection region, the image processing apparatus 109 converts, in step ST44, a difference between the reference viewpoint position and the current viewpoint position into a difference of the virtual viewpoint from the reference virtual viewpoint position, to calculate a virtual viewpoint position (see FIG. 5). Next, in step ST45, the image processing apparatus 109 calculates a shape and a position of the view frustum from the virtual viewpoint position. After the processing of step ST45, the image processing apparatus 109 proceeds to the processing of step ST46.

Whereas, when the line-of-sight is not within the line-of-sight detection region in step ST43, the image processing apparatus 109 acquires, in step ST47, a long-term viewpoint position and therefore an update value of the reference viewpoint position, by averaging viewpoint positions for every fixed movement average interval. Then, in step ST48, the image processing apparatus 109 adopts the long-term viewpoint position acquired in step ST47 as the reference viewpoint position, and stores in the storage unit 111.

Note that step ST47 and step ST48 are executed for every fixed movement average interval, for example, every 500 msec. However, it is conceivable to perform steps ST47 and ST48 with the viewpoint and viewpoint detection cycles of the viewpoint measuring unit 105 and the line-of-sight measuring unit 106. In that case, in step ST47, viewpoint positions of a past constant movement average interval are averaged to acquire the long-term viewpoint position.

Next, in step ST49, the image processing apparatus 109 calculates a shape and a position of a view frustum from the reference virtual viewpoint position. In this way, when the line-of-sight is not within the line-of-sight detection region, a shape and a position of the view frustum are always calculated from the reference virtual viewpoint position without being affected by the current viewpoint position. Therefore, a display image of a rear visual field displayed on the video image display unit 107 becomes stable regardless of motion of the viewpoint position of the driver (the user). After the processing of step ST49, the image processing apparatus 109 proceeds to the processing of step ST46. The image processing apparatus 109 performs display image processing in step ST46, then returns to the processing in step ST41, and repeats similar processing as described above.

Figure 21:
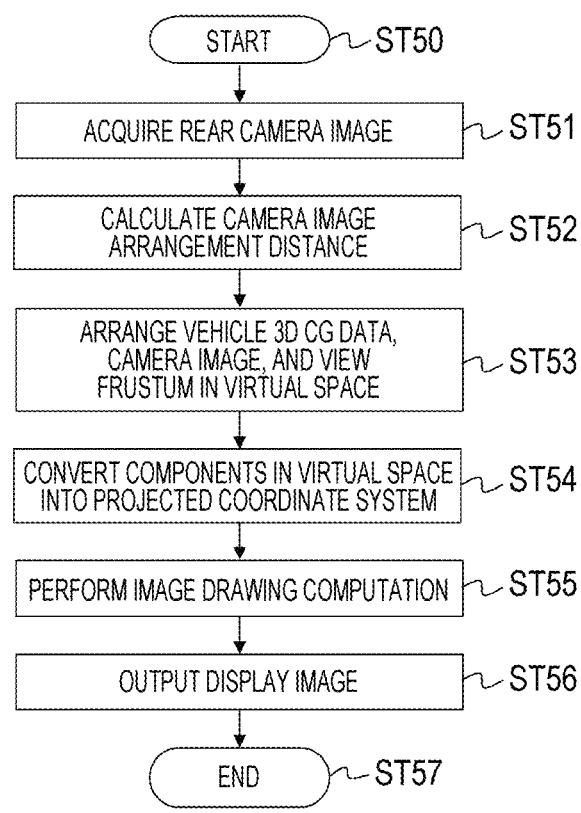
FIG. 21 is a flowchart showing an example of display image processing.

A flowchart of FIG. 21 shows an example of the display image processing. In step ST50, the image processing apparatus 109 starts processing. Next, in step ST51, the image processing apparatus 109 acquires a rear camera image obtained by the rear image capturing unit 103. Next, in step ST52, the image processing apparatus 109 calculates a camera image arrangement distance.

Next, in step ST53, the image processing apparatus 109 arranges, in the virtual space, 3D CG data of the vehicle 10 (the car body, the window, the interior, and the like), a camera image, and a view frustum, which are the elements necessary for drawing (see FIG. 18). Next, in step ST54, the image processing apparatus 109 converts components in the virtual space into a projected coordinate system, to obtain a projection image.

Next, in step ST55, the image processing apparatus 109 performs processing for drawing details of the camera image and the 3D CG data on the projection image, to obtain a display image. Next, in step ST56, the image processing apparatus 109 outputs the display image to the video image display unit 107. After the processing in step ST56, the image processing apparatus 109 ends a series of processing in step ST57.

The image processing apparatus 109 executes processing of the above-mentioned normal operation flow for every detection cycle of a viewpoint and a line-of-sight. Therefore, in a case where the line-of-sight of the driver (the user) is on the video image display unit 107, in the display image displayed on the video image display unit 107, an overlapping degree of a drawing target object is changed appropriately depending on motion of the viewpoint and a distance between with the body of interest on a rear side, that is, an appropriate motion parallax can be obtained. Then, the driver can obtain an appropriate sense of distance with respect to the rear camera image.

Figure 22:
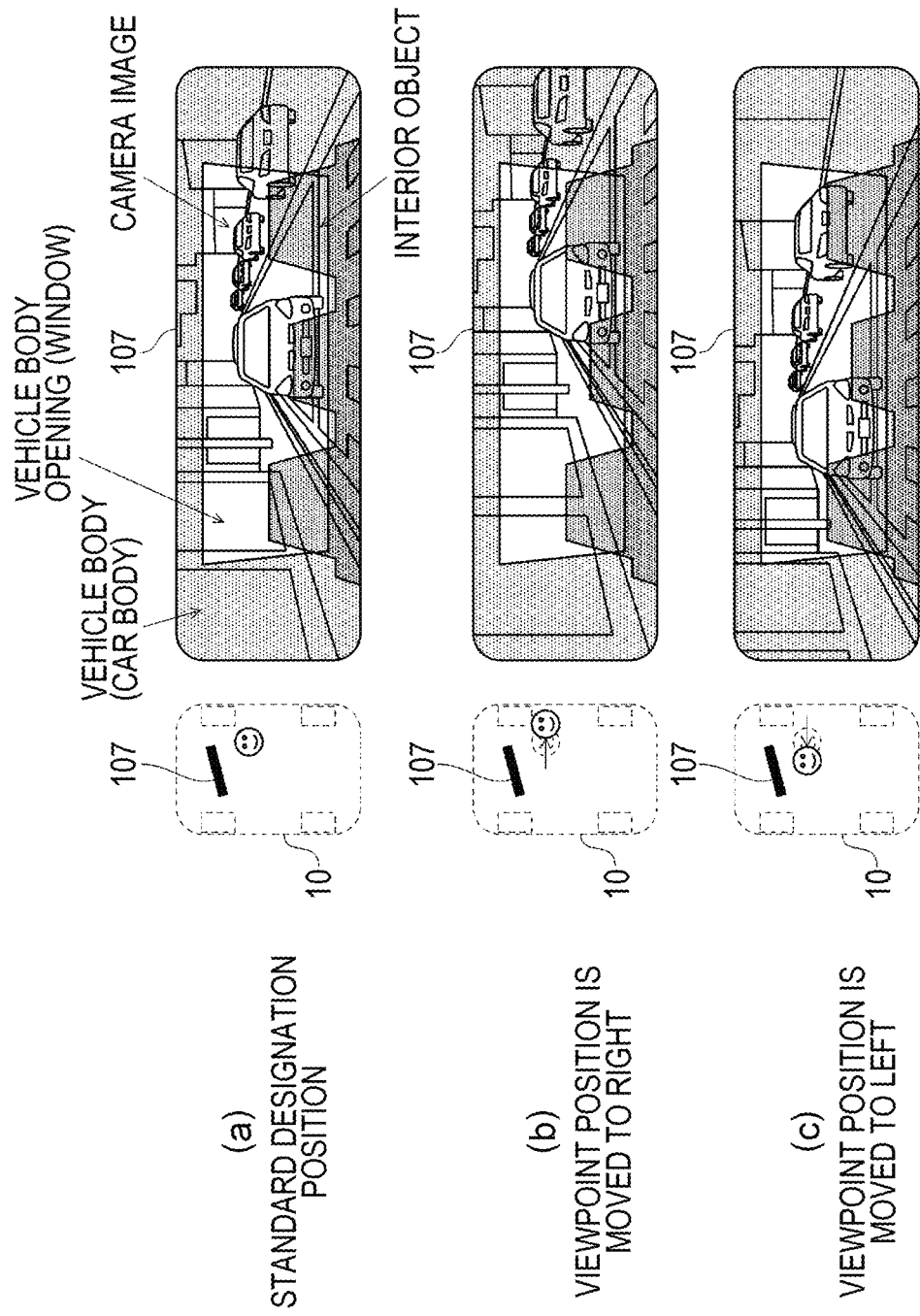
FIG. 22 is a view showing a change in an overlapping degree of drawing object movement due to viewpoint motion.

FIGS. 22(*a*), 22(*b*), and 22(*c*) show an example of the display image displayed on the video image display unit 107. FIG. 22(*a*) shows a case where a viewpoint position of the driver is at a standard viewpoint position, FIG. 22(*b*) shows a case where the viewpoint position of the driver is moved to the right from the standard viewpoint position, and FIG. 22(*c*) shows a case where the viewpoint position of the driver is moved to the left from the standard viewpoint position. It can be seen that an overlapping degree between a vehicle interior CG image and an object (an automobile) in the camera image changes in accordance with the viewpoint position of the driver.

Note that, in real mirrors, interior objects and the vehicle body create a blind spot where the rear side cannot be seen. However, in the present technology, by transparently drawing at a time of drawing, or by hiding a part, it is also possible to maintain a wide rear visual field while assisting perception of a sense of distance by motion parallax. For example, FIG. 23(*a*) is a state where the rear seat as the interior object is hidden. Furthermore, FIG. 23(*b*) shows the vehicle body and the rear seat as the interior object with a low transmittance, and FIG. 23(*c*) shows the vehicle body and the rear seat as the interior object with a high transmittance.

Of course, if the occurrence of blind spots is not a concern, the interior object or the vehicle body may be drawn with transmittance of 0% to generate and display an image like a real mirror.

Figure 23:
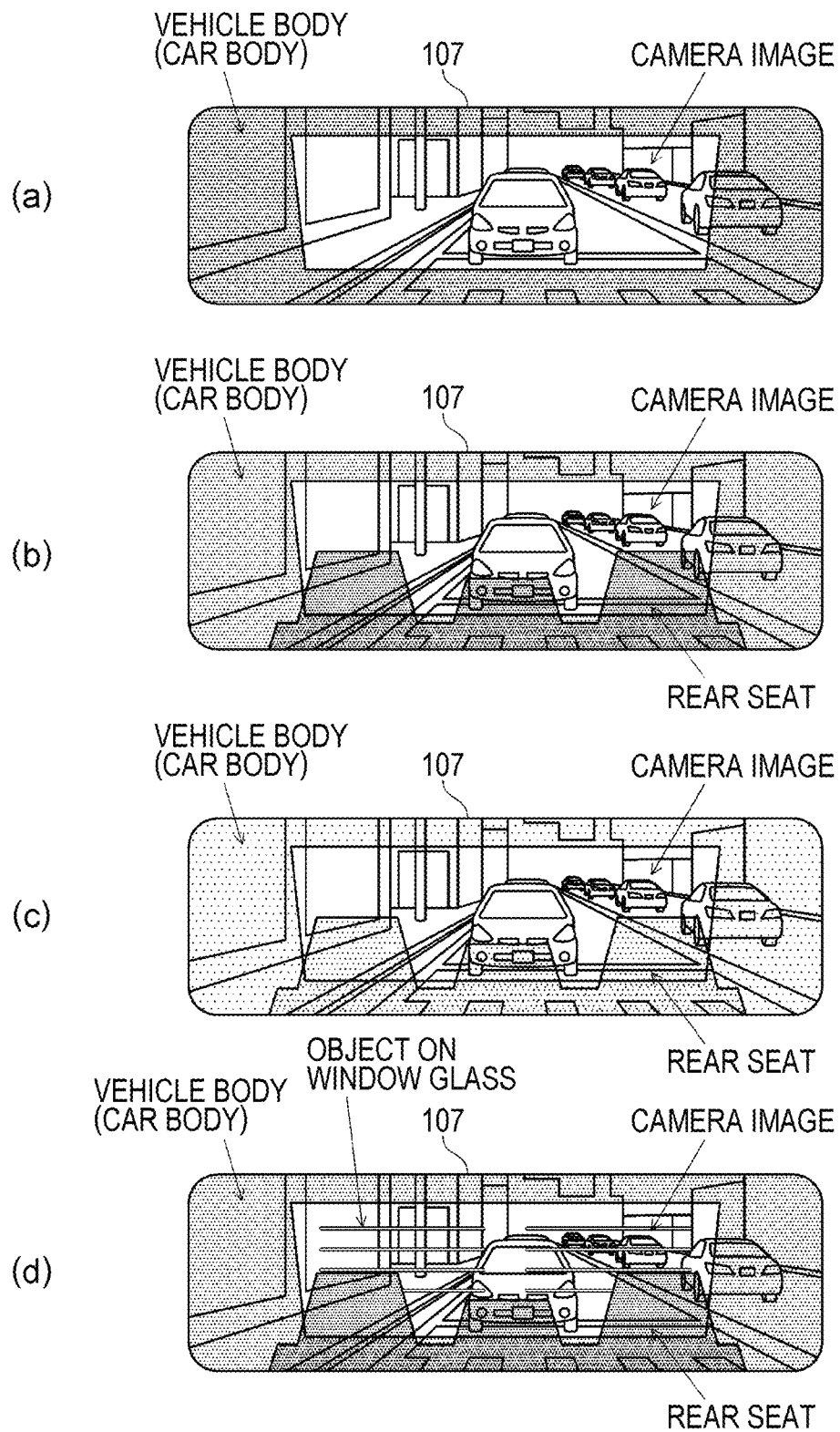
FIG. 23 is a view showing variations in drawing processing.

Furthermore, the interior object is not limited to the sheet or the like, and distance perception can be further emphasized by drawing a pattern on a window glass, for example. FIG. 23(*d*) shows a state where a horizontal line is provided as an object on the window glass.

By performing the processing of the above-mentioned normal operation flow, in a case where line-of-sight of the driver (the user) is not on the video image display unit 107, the image processing apparatus 109 updates the reference viewpoint position on the basis of a long-term fluctuation of the viewpoint position of the driver. Therefore, even if a posture of the driver changes, the rear visual field can be appropriately displayed continuously on the video image display unit 107.

Figure 24:
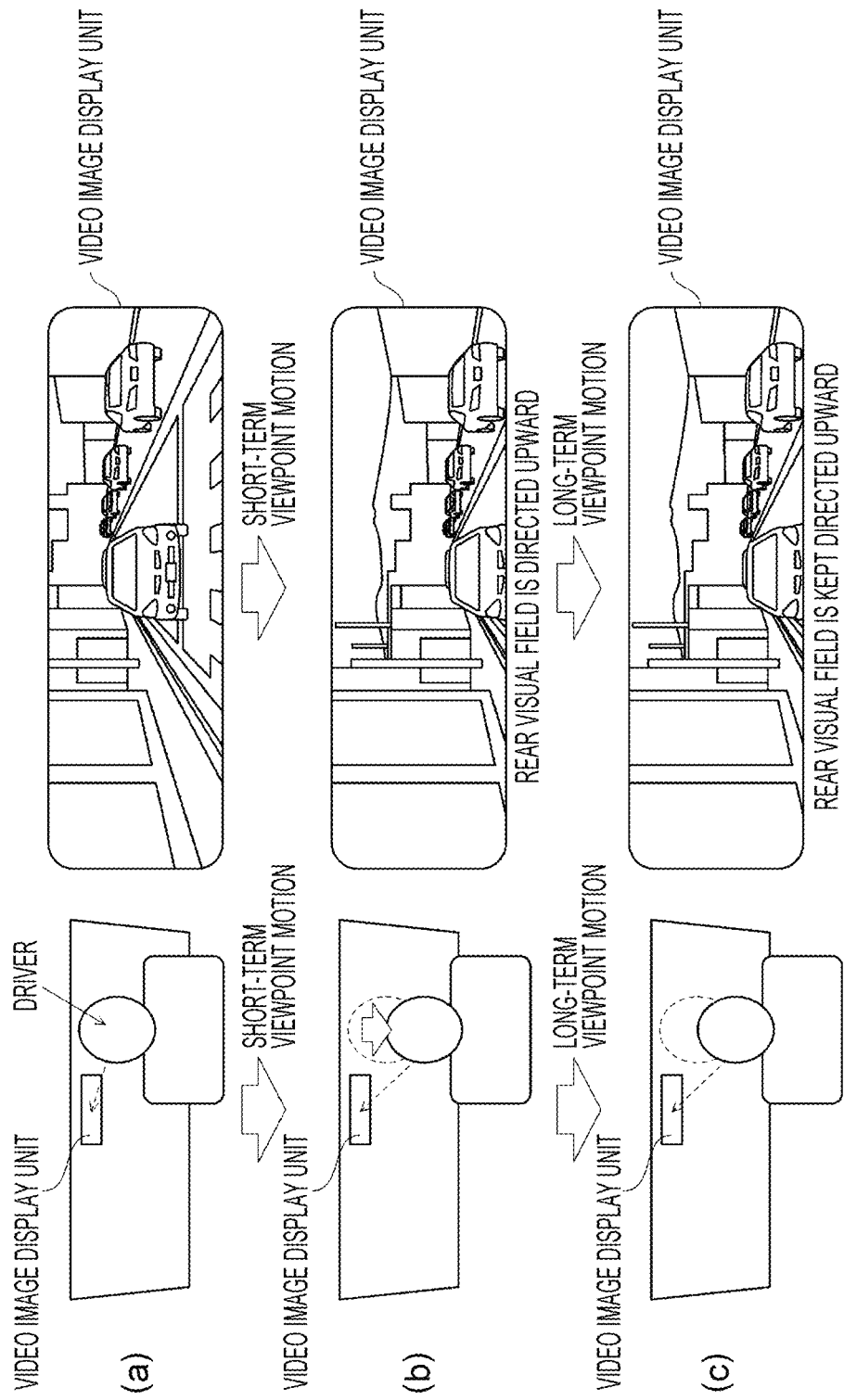
FIG. 24 is a view for explaining conventional electronic mirror (rearview mirror) technology.

FIGS. 24(*a*) to 24(*c*) show conventional electronic mirror (rearview mirror) technology. FIG. 24(*a*) shows that, in a case where a posture of the driver (the user) is at an appropriate position, the rear visual field is properly displayed on the video image display unit with the reference visual field. FIG. 24(*b*) shows that the rear visual field displayed on the video image display unit is directed upward in a case where there is a sudden fluctuation (a short-term viewpoint fluctuation) in the viewpoint position of the driver due to the driver's entire body sinking into the seat. FIG. 24(*c*) shows that the rear visual field displayed on the video image display unit kept directed upward in a case where there is a fluctuation of the viewpoint position of the driver (a long-term viewpoint fluctuation) due to continuous sinking of the driver's entire body into the seat.

Figure 25:
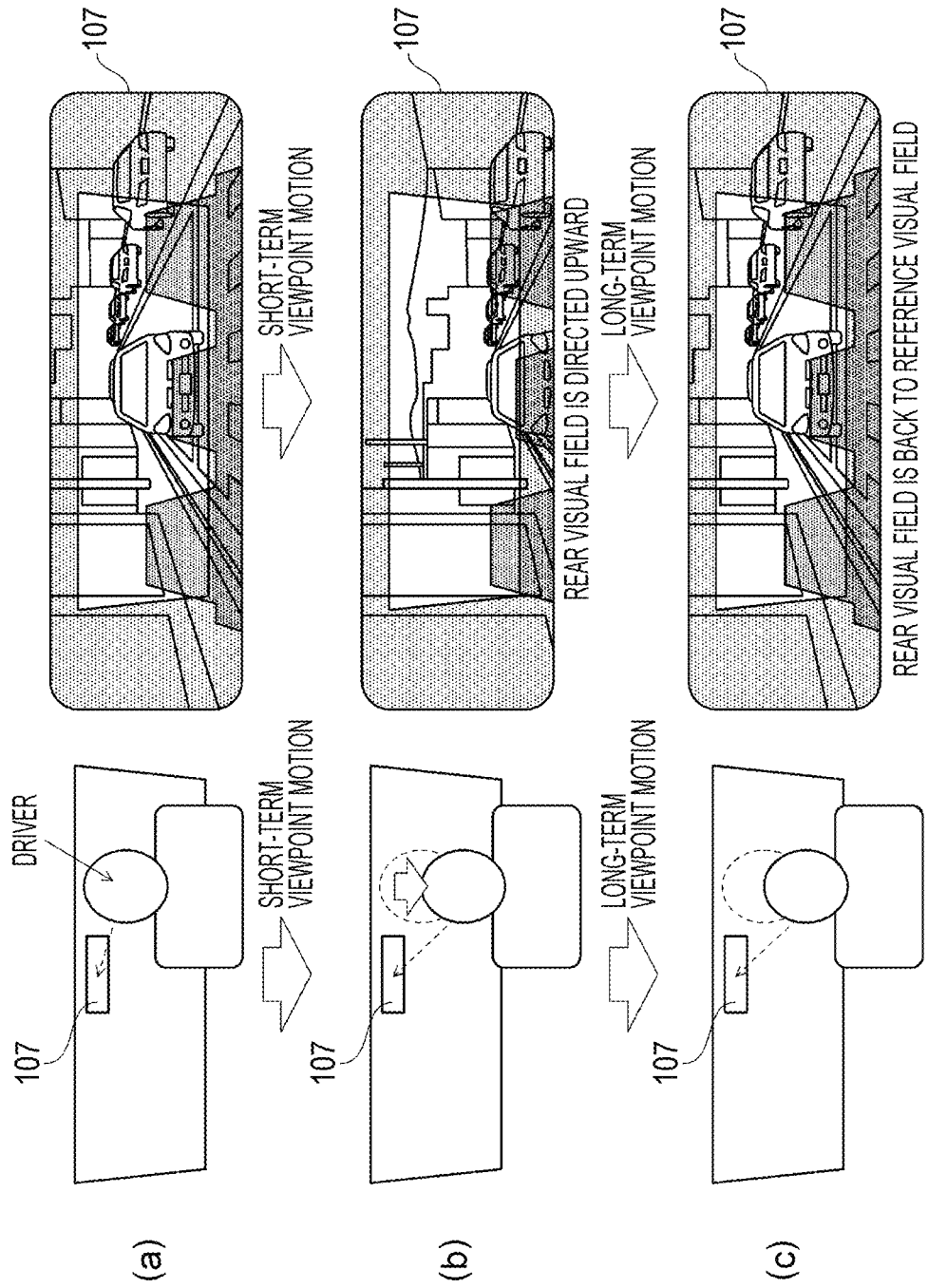
FIG. 25 is a view for explaining electronic mirror (rearview mirror) technology of the present technology.

FIGS. 25(*a*) to 25(*c*) show electronic mirror (rearview mirror) technology of the present technology. FIG. 25(*a*) shows that, in a case where a posture of the driver (the user) is at an appropriate position, the rear visual field is properly displayed on the video image display unit 107 with the reference visual field. FIG. 25(*b*) shows that the rear visual field displayed on the video image display unit 107 is directed upward in a case where there is a sudden fluctuation (a short-term viewpoint fluctuation) in the viewpoint position of the driver due to the driver's entire body sinking into the seat. FIG. 25(*c*) shows that the rear visual field displayed on the video image display unit 107 is back to the reference visual field and is properly displayed, in a case where there is a fluctuation of the viewpoint position of the driver (a long-term viewpoint fluctuation) due to continuous sinking of the driver's entire body into the seat.

As described above, in the vehicle 10 shown in FIG. 1, when a line-of-sight of the driver is in a certain region (a line-of-sight detection region) including the video image display unit 107, the image processing apparatus 109 shown in FIG. 3 obtains a display image in accordance with motion of a viewpoint of the driver, on the basis of a camera image obtained by capturing an image of a rear side from the vehicle 10. Therefore, it is possible to provide a driver with a visual field that is intuitive and easily viewable, and to stabilize display in a case where the driver is not carrying out looking operation.

Furthermore, in the vehicle 10 shown in FIG. 1, the image processing apparatus 109 shown in FIG. 3 updates the reference viewpoint position on the basis of a long-term fluctuation of the viewpoint position. Therefore, it becomes possible to display a visual field that is intuitive and easily viewable, and to obtain an appropriate rear visual field even if a posture of the driver changes.

Furthermore, in the vehicle 10 shown in FIG. 1, when a line-of-sight of the driver is in a certain region (a line-of-sight detection region) including the video image display unit 107 that displays a display image, the image processing apparatus 109 shown in FIG. 3 does not update the reference viewpoint position. Therefore, since a display view angle of a rear video image changes accurately in response to a viewpoint fluctuation of the driver, it is possible to accurately provide a visual field that is intuitive and easily viewable.

Furthermore, in the vehicle 10 shown in FIG. 1, the image processing apparatus 109 shown in FIG. 3 registers a viewpoint position of the driver as an initial reference viewpoint position, in a case where a line-of-sight of the driver is continuously present for a certain period of time on the video image display unit 107 that displays the display image, when the viewpoint position of the driver enters a certain region corresponding to a seated state. Therefore, it becomes possible to provide an appropriate rear visual field to the driver from the beginning of driving, even in a case where the driver is changed.

Furthermore, in the vehicle 10 shown in FIG. 1, the image processing apparatus 109 shown in FIG. 3 superimposes a vehicle interior image on a camera image obtained by capturing an image on a rear side from the vehicle, and obtains a display image to be displayed on the video image display unit 107 that is arranged in place of the conventional room mirror. The display image is not only made from the camera image obtained by capturing an image of a rear side of the vehicle, but the display image is obtained by superimposing the vehicle interior image on the camera image. Therefore, it is possible to easily provide a sense of distance by motion parallax.

Furthermore, in the vehicle 10 shown in FIG. 1, the image processing apparatus 109 shown in FIG. 3 changes a superimposed positional relationship between the camera image and the vehicle interior image, in accordance with a deviation of a viewpoint position of the driver from a reference viewpoint position. Therefore, it is possible to generate motion parallax that is close to that of looking at an actual rearview mirror, and can assist the driver's perception of between distances.

Furthermore, in the vehicle 10 shown in FIG. 1, the image processing apparatus 109 shown in FIG. 3 arranges a camera image and an image showing the vehicle 10 in a three-dimensional space, obtains a virtual viewpoint position that changes in accordance with motion of a viewpoint of the driver, and converts the camera image and the vehicle interior image into a projected coordinate system with a visual field determined by the virtual viewpoint position, to obtain a display image. Therefore, it is possible to accurately change the superimposed positional relationship between the camera image and the vehicle interior image, in accordance with motion of a viewpoint of the driver.

Furthermore, in the vehicle 10 shown in FIG. 1, the image processing apparatus 109 shown in FIG. 3 arranges a camera image at a position of a body of interest (an object) existing on a rear side from the vehicle 10, to obtain a display image. Therefore, the body of interest can be arranged with a proper size at a proper position in the three-dimensional space, and motion parallax that occurs between the body and the vehicle interior image can be correctly expressed.

Note that the effects described in this specification are merely examples and are not limited, and additional effects may be present.

2. Modified Example

Note that, the above-described embodiment has shown an example in which the present technology is applied to an electronic mirror that substitutes for a room mirror of a vehicle. However, the present technology can also be applied to an electronic mirror that substitutes for a side mirror of a vehicle. Furthermore, by applying the present technology, not only an electronic mirror for a vehicle, but also an electronic mirror that is supposed to be used by one person can present a sense of distance close to that of an actual mirror. Similarly, the present technology can be applied to an electronic window instead of an electronic mirror, on an assumption of being used by one person.

Figure 26:
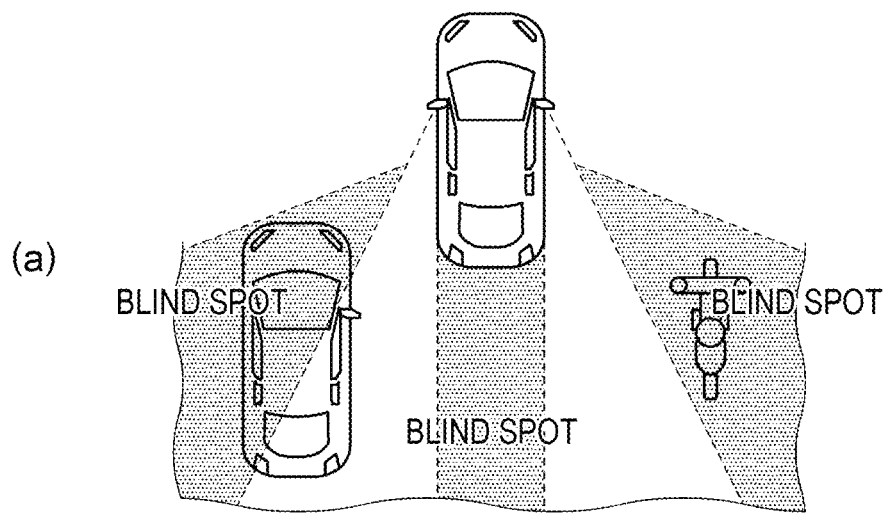
FIG. 26 is a view for explaining a related art regarding a side mirror.
Figure 26:
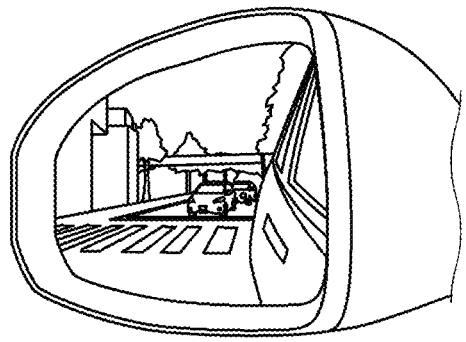
Figure 26:
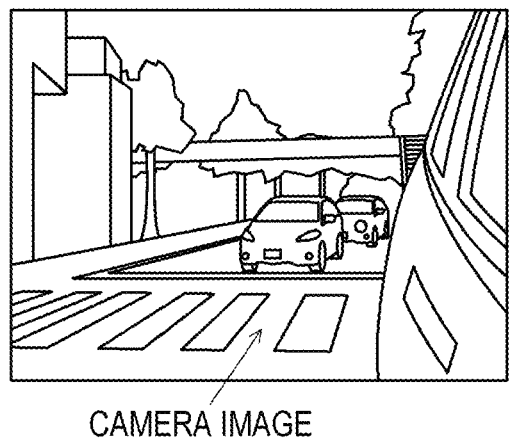

A case where the present technology is applied to an electronic mirror that substitutes for a side mirror of a vehicle will be described. FIG. 26(a) shows an example of a range of a blind spot in a case where a conventional side mirror or an electronic mirror that substitutes for the conventional side mirror is used. FIG. 26(b) shows an example of an image reflected in a conventional side mirror. In this case, a sense of distance of a body on a rear side can be obtained by a difference in a size of the body on a rear side and motion parallax with the shown vehicle body. FIG. 26(c) shows an example of a display image of an electronic mirror that substitutes for a conventional side mirror. In this case, since motion parallax does not occur even if a viewpoint moves, it is difficult to obtain a sense of distance unlike a real mirror.

Figure 27:
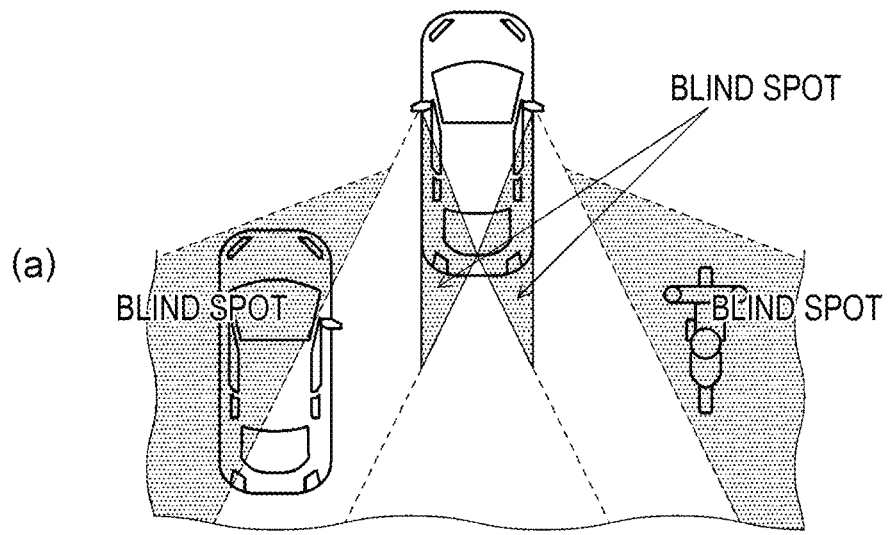
FIG. 27 is a view for explaining an electronic mirror that substitutes for a side mirror and to which the present technology is applied.
Figure 27:
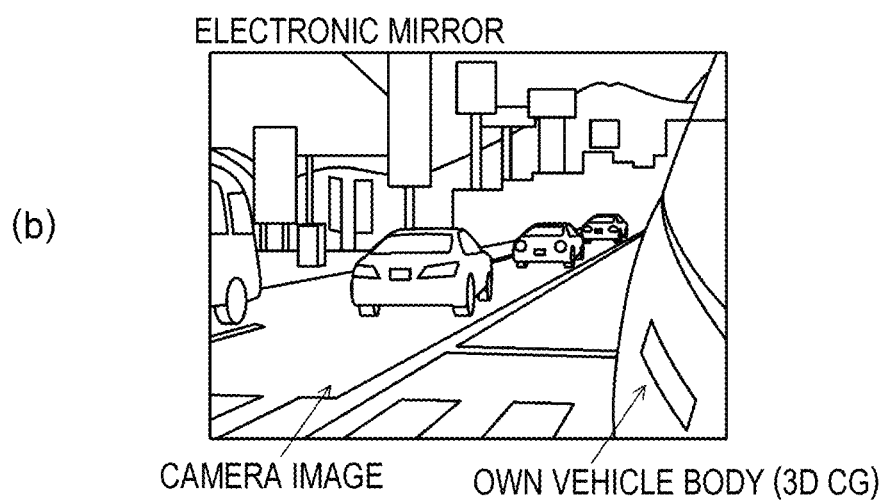
Figure 27:
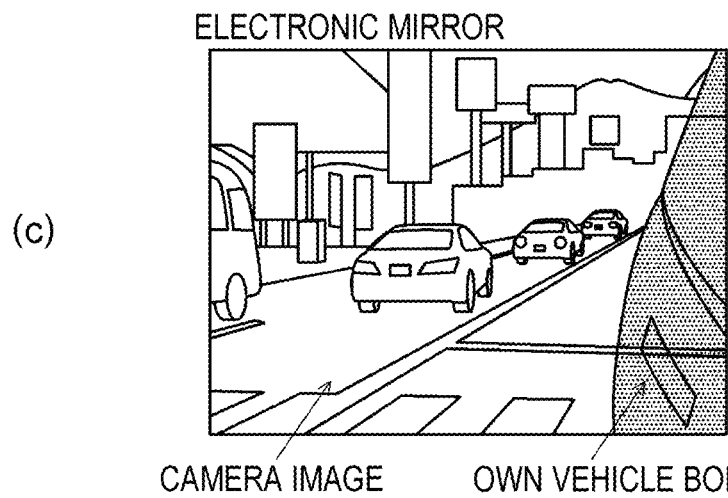

FIG. 27(a) shows an example of a range of a blind spot in a case of using an electronic mirror that substitutes for a side mirror and to which the present technology is applied. A driver can also visually recognize behind the own vehicle, which is a blind spot with a conventional side mirror or an electronic mirror that substitutes for the conventional side mirror. FIGS. 27(b) and 27(c) show an example of a display image of an electronic mirror that substitutes for the side mirror and to which the present technology is applied. In this case, since the own vehicle body is superimposed and drawn by 3D CG, it is possible to provide a sense of distance with motion parallax. Furthermore, as shown in FIG. 27(c), superimposing the own vehicle body transparently allows visual recognition behind the own vehicle.

Figure 28:
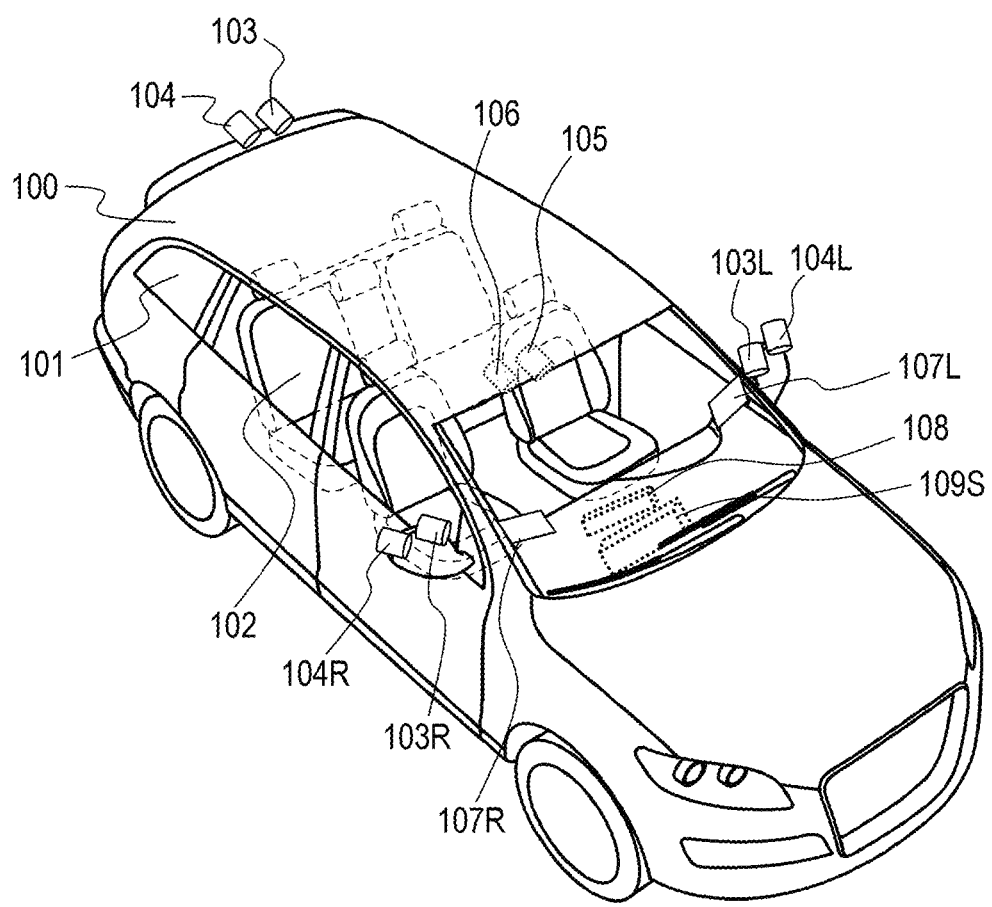
FIG. 28 is a view showing an example of component arrangement of a vehicle.

FIG. 28 shows an example of component arrangement of a vehicle 10. In this FIG. 28, parts corresponding to those in FIG. 1 are given with the same reference numerals, and detailed description thereof will be omitted as appropriate. The vehicle 10 has a vehicle body (a car body) 100, a vehicle body opening (a window) 101, and an interior object 102 such as a seat. Furthermore, the vehicle 10 has a rear image capturing unit 103, a rear distance measuring unit 104, a viewpoint measuring unit 105, and a line-of-sight measuring unit 106.

Furthermore, the vehicle 10 has a right-side rear image capturing unit 103R, a right-side rear distance measuring unit 104R, a left-side rear image capturing unit 103L, and a left-side rear distance measuring unit 104L. The right-side rear image capturing unit 103R and the left-side rear image capturing unit 103L are each configured by, for example, a CMOS camera, and attached to, for example, a conventional side mirror position of the vehicle 10 so as to capture a rear image. Furthermore, the right-side rear distance measuring unit 104R and the left-side rear distance measuring unit 104L are each configured by, for example, a ToF distance image sensor, and attached to, for example, a conventional side mirror position of the vehicle 10 so as to acquire a rear distance image.

Furthermore, the vehicle 10 has a right-side rear video image display unit (a display) 107R, a left-side rear video image display unit (a display) 107L, a user operation unit 108, and an image processing apparatus 109S. The right-side rear video image display unit 107R and the left-side rear video image display unit 107L are each configured by an LCD, an organic EL panel, or the like, attached to right and left side positions inside on a front side of the vehicle 10, and have a substantially rectangular display surface.

The user operation unit 108 constitutes a user interface that receives various operations by the driver. The user operation unit 108 includes, for example, a mechanical operation button arranged on an in-front panel, and further includes a touch panel arranged on a screen of the right-side rear video image display unit 107R or the left-side rear video image display unit 107L, and the like.

The image processing apparatus 109S performs processing for obtaining a display image to be displayed on the right-side rear video image display unit 107R and the left-side rear video image display unit 107L. The image processing apparatus 109S is arranged at any location inside the vehicle 10, for example, in an in-front panel part as illustrated. The image processing apparatus 109S obtains a display image by superimposing and composing, with 3D CG, the vehicle body (the car body) as an image showing the vehicle 10, on a camera image obtained by capturing an image with the rear image capturing unit 103, the right-side rear image capturing unit 103R, and the left-side rear image capturing unit 103L.

In this way, the display image is not made only with the camera image, but the display image is obtained by superimposing a vehicle body image on the camera image. Therefore, it is possible to easily provide a sense of distance by motion parallax. Furthermore, by superimposing the vehicle body image transparently, the driver (the user) can visually recognize an invisible body hidden behind the own vehicle.

Figure 29:
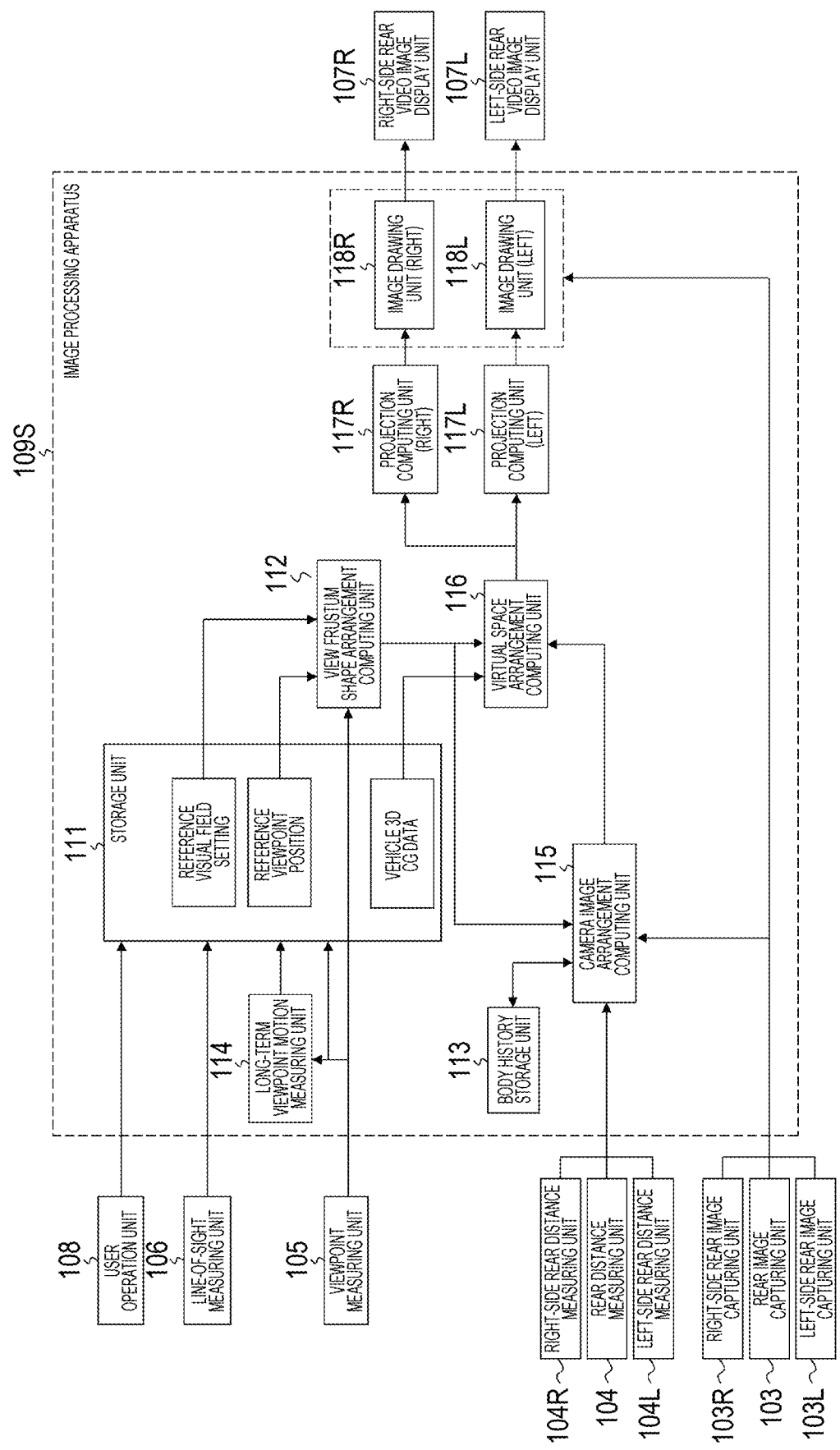
FIG. 29 is a block diagram showing a configuration example of the image processing apparatus.

FIG. 29 shows a configuration example of the image processing apparatus 109S. In this FIG. 29, parts corresponding to those in FIG. 3 are given with the same reference numerals, and detailed description thereof will be omitted as appropriate. The image processing apparatus 109S includes a storage unit 111, a view frustum shape position computing unit 112, a body history storage unit 113, a long-term viewpoint motion measuring unit 114, a camera image arrangement computing unit 115, a virtual space arrangement computing unit 116, a projection computing unit (right) 117R, a projection computing unit (left) 117L, an image drawing unit (right) 118R, and an image drawing unit (left) 118L.

The image processing apparatus 109S arranges, in a virtual space, a camera image obtained by capturing an image on a rear side, in addition to a component to be image-processed, that is, 3D CG data (a car body, and the like) of the vehicle 10. Then, the image processing apparatus 109S obtains a view frustum on the basis of a virtual viewpoint position and a virtual video image display unit that are related to right-side rear display, performs enlargement/reduction processing on an image generated with this view frustum as necessary, and then outputs as a right-side rear display image to be displayed on the right rear video image display unit 107R.

Furthermore, similarly, the image processing apparatus 109S obtains a view frustum on the basis of a virtual viewpoint position and a virtual video image display unit that are related to left-side rear display, performs enlargement/reduction processing on an image generated with this view frustum as necessary, and then outputs as a left-side rear display image to be displayed on the left rear video image display unit 107L.

In this case, the image processing apparatus 109S measures, as relative motion with respect to a reference viewpoint position, movement of a viewpoint position of the driver measured by the viewpoint measuring unit 105. In corresponding to this, the image processing apparatus 109S moves the virtual viewpoint position from a reference virtual viewpoint position, to change an image (a video image) displayed on the right-side rear video image display unit 107R and the left-side rear video image display unit 107L, and provides the driver with appropriate motion parallax.

The storage unit 111 stores information regarding the reference viewpoint position and a reference visual field setting related to the right-side rear display and the left-side rear display, as well as 3D CG data of the vehicle. The image processing apparatus 109 executes an initialization flow after the driver (the user) is seated in the driver's seat, and automatically registers an appropriate reference viewpoint position for the driver in the storage unit 111. This reference viewpoint position is sequentially updated from an initial reference viewpoint position, on the basis of a long-term fluctuation of the viewpoint position.

The image processing apparatus 109 executes an initialization flow after the driver (the user) is seated in the driver's seat, and automatically registers an appropriate reference viewpoint position for the driver in the storage unit 111. The reference viewpoint position registered in this initialization flow is the initial reference viewpoint position. By registering the initial reference viewpoint position in this way, it is possible to absorb individual differences in a viewpoint position that should be a reference for the driver. Further, it becomes possible to provide an appropriate rear visual field to the driver from the beginning of driving, even in a case where the driver is changed.

The long-term viewpoint motion measuring unit 114 updates the reference viewpoint position stored in the storage unit 111 in the normal operation flow, on the basis of a long-term fluctuation of a viewpoint position of the driver obtained by the viewpoint measuring unit 105. The view frustum shape position computing unit 112 calculates a shape and a position of two view frustums for the right-side rear display and the left-side rear display in a virtual space, on the basis of information regarding the reference viewpoint position and the reference visual field setting read from the storage unit 111, and the current viewpoint position detected by the viewpoint measuring unit 105.

The camera image arrangement computing unit 115 calculates an arrangement distance of a camera image in the virtual space on the basis of: a rear distance image acquired by the right-side rear distance measuring unit 104R, the rear distance measuring unit 104, and the left-side rear distance measuring unit 104L; a rear camera image acquired by the right-side rear image capturing unit 103R, the rear image capturing unit 103, and the left-side rear image capturing unit 103L; the shape and the position of the two view frustums for the right-side rear display and the left-side rear display obtained by the view frustum shape arrangement computing unit 112; and the like.

Depending on this arrangement position of the camera image, appearance (motion parallax) of a subject that is shown in the camera image and appears and disappears in the vehicle body (the car body) differs when the driver moves the viewpoint position. In this case, for allowing an appropriate motion parallax to be provided for a body of interest, a distance to the body is calculated as an arrangement distance. Here, a case is also assumed in which the body of interest is different for the right-side rear display and the left-side rear display. In that case, the arrangement distance of the camera image is calculated to be different values for the right-side rear display and the left-side rear display.

Figure 30:
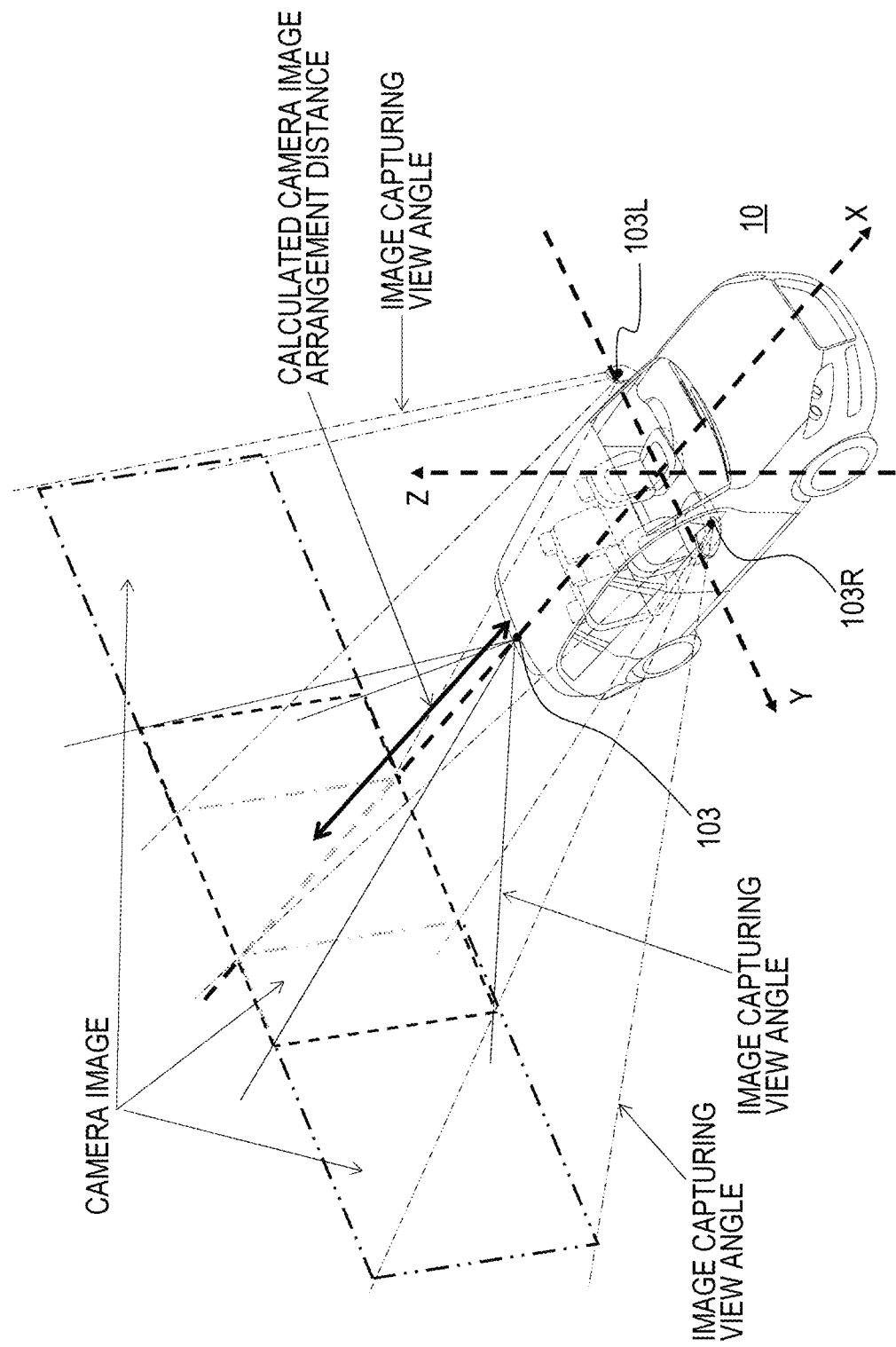
FIG. 30 is a view showing an arrangement position of a camera image in a virtual space.

FIG. 30 shows an arrangement position of a camera image in a virtual space. The camera image has been obtained by capturing an image with the right-side rear image capturing unit 103R, the rear image capturing unit 103, and the left-side rear image capturing unit 103L, at a predetermined image capturing view angle. This camera image is arranged in the virtual space at a position separated from a rear part of the vehicle 10, by a camera image arrangement distance calculated by the camera image arrangement computing unit 115.

Figure 31:
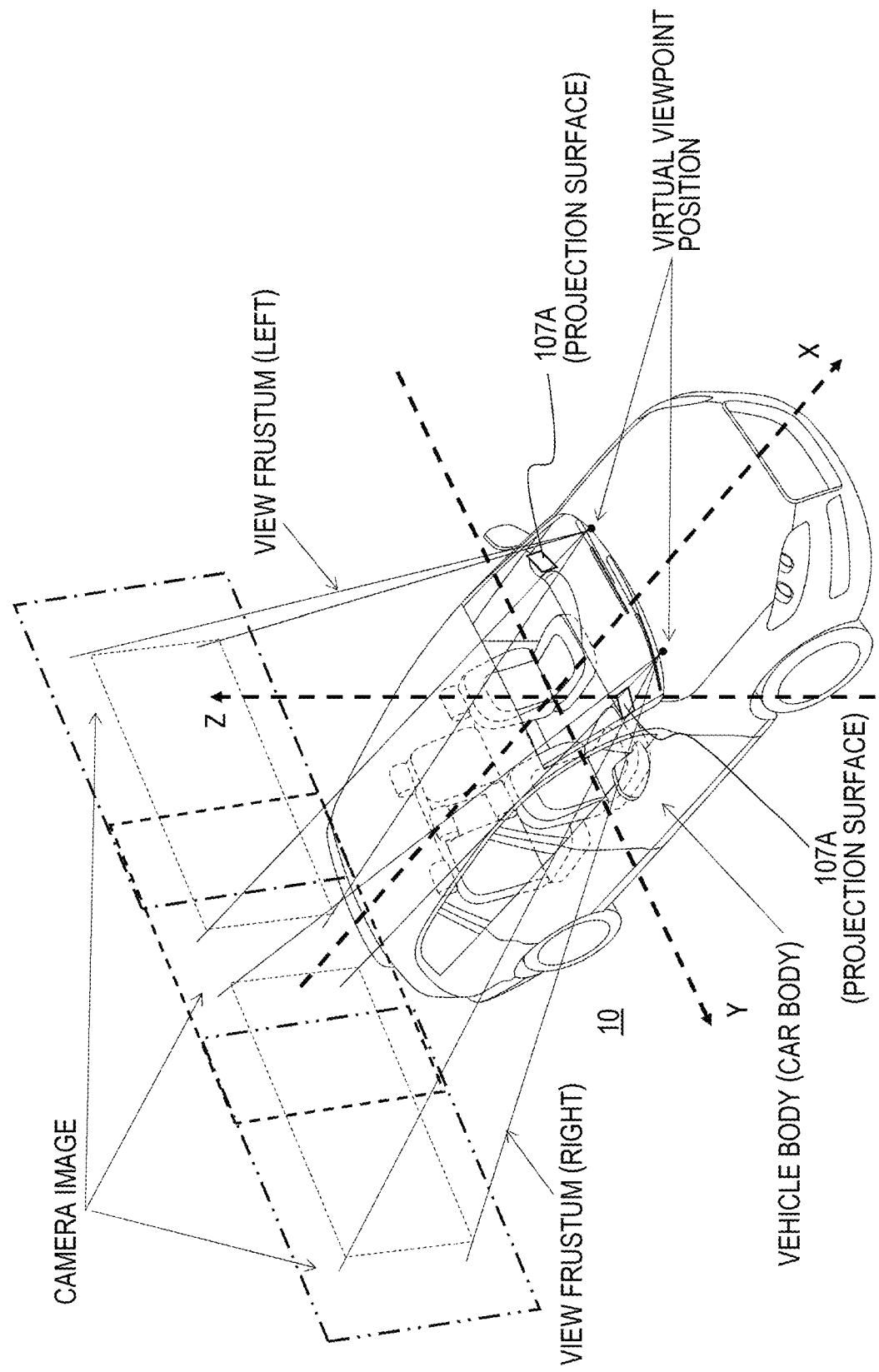
FIG. 31 is a view showing an arrangement example of elements necessary for drawing in a virtual space.

The virtual space arrangement computing unit 116 arranges elements necessary for drawing in the virtual space. That is, the virtual space arrangement computing unit 116 arranges, in the virtual space, 3D CG data of the vehicle 10 (the car body, and the like) stored in the storage unit 111. The virtual space arrangement computing unit 116 also arranges the camera image at a position of the camera image arrangement distance calculated by the camera image arrangement computing unit 115, and further arranges two view frustums for the right-side rear display and the left-side rear display on the basis of a shape and a position calculated by the view frustum shape arrangement computing unit 112. FIG. 31 shows an arrangement example of elements necessary for drawing in the virtual space.

Returning to FIG. 29, the projection computing unit (right) 117R converts an object in the virtual space into a projection image, with the virtual video image display unit 107A on a right side as a projection surface. The image drawing unit (right) 118R performs processing for drawing details of the camera image and the 3D CG data on the projection image obtained by the projection computing unit 117R. The image drawing unit (right) 118R further performs enlargement/reduction processing for matching a size of an image to a size of the right-side rear video image display unit 107R, to output a display image to be supplied to the right-side rear video image display unit 107R.

Furthermore, the projection computing unit (left) 117L converts an object in the virtual space into a projection image, with the virtual video image display unit 107A on a left side as a projection surface. The image drawing unit (left) 118L performs processing for drawing details of the camera image and the 3D CG data on the projection image obtained by the projection computing unit 117L. The image drawing unit (left) 118L further performs enlargement/reduction processing for matching a size of an image to a size of the left-side rear video image display unit 107L, to output a display image to be supplied to the left-side rear video image display unit 107L.

Since a basic processing flow in the image processing apparatus 109S is similar to a processing flow of the image processing apparatus 109 in the above-described embodiment except that the left and right display units are processed separately, the description thereof will be omitted here.

Note that the series of processing in the image processing apparatuses 109 and 109S described above can be executed by hardware or also executed by software. In a case where the series of processing is performed by software, a program that configures the software is installed in a computer. Here, examples of the computer include, for example, a computer that is built in dedicated hardware, a general-purpose personal computer that can perform various functions by being installed with various programs, and the like.

Figure 32:
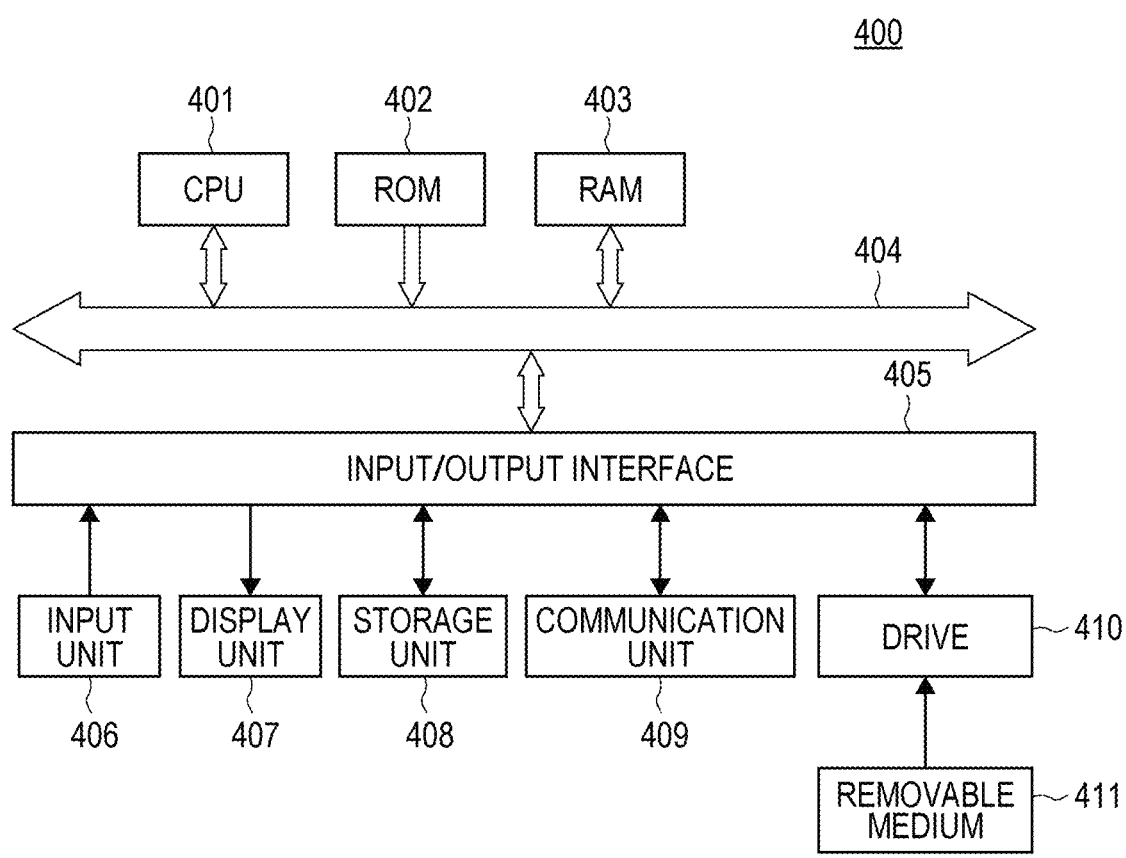
FIG. 32 is a block diagram showing a configuration example of hardware of a computer.

FIG. 32 is a block diagram showing a configuration example of hardware of a computer 400 that executes the series of processing described above in accordance with a program.

In the computer 400, a central processing unit (CPU) 401, a read only memory (ROM) 402, and a random access memory (RAM) 403 are mutually connected by a bus 404.

The bus 404 is further connected with an input/output interface 405. To the input/output interface 405, an input unit 406, an output unit 407, a recording unit 408, a communication unit 409, and a drive 410 are connected.

The input unit 406 includes an input switch, a button, a microphone, an image sensor, and the like. The output unit 407 includes a display, a speaker, and the like. The recording unit 408 includes a hard disk, a non-volatile memory, and the like. The communication unit 409 includes a network interface or the like. The drive 410 drives a removable medium 411 such as a magnetic disk, an optical disk, a magneto-optical disk, or a semiconductor memory.

In the computer 400 configured as described above, the series of processing described above is performed, for example, by the CPU 401 loading the program recorded in the recording unit 408 into the RAM 403 via the input/output interface 405 and the bus 404, and executing.

The program executed by the computer 400 (the CPU 401) can be provided by being recorded on, for example, the removable medium 411 as a package medium or the like. Furthermore, the program can be provided via a wired or wireless transmission medium such as a local area network, the Internet, or digital satellite broadcasting.

In the computer, by attaching the removable medium 411 to the drive 410, the program can be installed in the recording unit 408 via the input/output interface 405. Furthermore, the program can be received by the communication unit 409 via a wired or wireless transmission medium, and installed in the recording unit 408. Besides, the program can be installed in advance in the ROM 402 and the recording unit 408.

Note that the program executed by the computer may be a program that performs processing in a time series according to an order described in this specification, or may be a program that performs processing in parallel or at necessary timing such as when a call is made.

Furthermore, although the preferred embodiment of the present disclosure has been described above in detail with reference to the accompanying drawings, the technical scope of the present disclosure is not limited to such an example. It is obvious that those with ordinary skill in the technical field of the present disclosure can arrive various variations or modifications within the scope of the technical idea described in the claims, and it is naturally understood that these also fall within the technical scope of the present disclosure.

Furthermore, the present technology can also have the following configurations.

(1) An image processing apparatus including:
  a processing unit configured to obtain a display image to be displayed on a display unit in accordance with motion of a viewpoint of a driver, on the basis of a captured image obtained by capturing an image on a rear side from a vehicle, when a line-of-sight of the above-described driver is in a certain region including the above-described display unit.

(2) The image processing apparatus according to (1) above, in which
  the above-described processing unit obtains the above-described display image in accordance with a deviation of a viewpoint position of the above-described driver from a reference viewpoint position.

(3) The image processing apparatus according to (2) above, in which
  the above-described processing unit updates the above-described reference viewpoint position on the basis of a long-term fluctuation of the above-described viewpoint position.

(4) The image processing apparatus according to (3) above, in which
  the above-described processing unit does not update the above-described reference viewpoint position when a line-of-sight of the above-described driver is in the above-described certain region.

(5) The image processing apparatus according to (3) or (4) above, in which
  the above-described processing unit averages, for each fixed interval, the above-described viewpoint position obtained sequentially at a predetermined sample rate, to obtain an update value of the above-described reference position.

(6) The image processing apparatus according to any one of (2) to (5) above, further including:
  a registration unit configured to register, as a reference viewpoint position, a viewpoint position of the above-described driver in a case where a line-of-sight of the above-described driver is continuously present for a certain period of time on the display unit that displays the above-described display image, when a viewpoint position of the above-described driver enters a certain region corresponding to a seated state.

(7) The image processing apparatus according to any one of (1) to (6) above, in which
  the above-described processing unit superimposes an image showing the above-described vehicle on the above-described captured image, to obtain the above-described display image.

(8) The image processing apparatus according to (7) above, in which
an image showing the above-described vehicle is a computer graphics image.
(9) The image processing apparatus according to (7) or (8) above, in which
a captured image obtained by capturing an image on a rear side from the above-described vehicle is a captured image captured by an image capturing device attached to a rear part of the above-described vehicle, and
an image showing the above-described vehicle is a vehicle interior image.
(10) The image processing apparatus according to (7) or (8) above, in which
a captured image obtained by capturing an image on a rear side from the above-described vehicle includes a captured image captured by an image capturing device attached to a side part of the above-described vehicle, and
an image showing the above-described vehicle is a vehicle body image.
(11) The image processing apparatus according to any one of (7) to (10) above, in which
the above-described processing unit changes a superimposed positional relationship between the above-described captured image and the image showing the above-described vehicle, in accordance with a deviation of a viewpoint position of the above-described driver from a reference viewpoint position.
(12) The image processing apparatus according to (11) above, in which
the above-described processing unit
arranges the above-described captured image and the image showing the above-described vehicle in a three-dimensional space, and
obtains a virtual viewpoint position that changes in accordance with a deviation of a viewpoint position of the above-described driver from a reference viewpoint position, and converts the above-described captured image and the image showing the above-described vehicle into a projected coordinate system with a visual field determined by the virtual viewpoint position, to obtain the above-described display image.
(13) The image processing apparatus according to (12) above, in which
the above-described processing unit arranges the above-described captured image at a position of a predetermined object existing on a rear side from the above-described vehicle.
(14) The image processing apparatus according to (13) above, in which
the above-described predetermined object is an object closest to the above-described vehicle.
(15) The image processing apparatus according to (13) above, in which the above-described predetermined object is an object being seen by the above-described driver.
(16) The image processing apparatus according to any one of (7) to (15) above, in which the above-described processing unit superimposes the image showing the above-described vehicle on the captured image to allow the captured image to be seen through.
(17) An image processing method including:
a procedure for obtaining a display image to be displayed on a display unit in accordance with motion of a viewpoint of a driver, on the basis of a captured image obtained by capturing an image on a rear side from a vehicle, when a line-of-sight of the above-described driver is in a certain region including the above-described display unit.
(18) An image processing system including:
an image capturing unit configured to capture an image on a rear side from a vehicle;
a processing unit configured to obtain a display image in accordance with motion of a viewpoint of a driver, on the basis of a captured image obtained by capturing an image with the above-described image capturing unit, when a line-of-sight of the above-described driver is in a certain region including a display unit; and
the display unit configured to display a display image obtained by the above-described processing unit.
(19) A program for causing a computer to function as:
processing means configured to obtain a display image to be displayed on a display unit in accordance with motion of a viewpoint of a driver, on the basis of a captured image obtained by capturing an image on a rear side from a vehicle, when a line-of-sight of the above-described driver is in a certain region including the above-described display unit.

REFERENCE SIGNS LIST

10 Vehicle
100 Vehicle body (car body)
101 Vehicle body opening (window)
102 Interior object
103 Rear image capturing unit
103R Right-side rear image capturing unit
103L Left-side rear image capturing unit
104 Rear distance measuring unit
104R Right-side rear distance measuring unit
104L Left-side rear distance measuring unit
105 Viewpoint measuring unit
106 Line-of-sight measuring unit
107 Video image display unit
107A Virtual video image display unit
107R Right-side rear video image display unit
107L Left-side rear video image display unit
108 User operation unit
109, 109S Image processing apparatus
111 Storage unit
112 View frustum shape arrangement computing unit
113 Body history storage unit
114 Long-term viewpoint motion measuring unit
115 Camera image arrangement computing unit
116 Virtual space arrangement computing unit
117 Projection computing unit
117R Projection computing unit (right)
117L Projection computing unit (left)
118 Image drawing unit
118R Image drawing unit (right)
118L Image drawing unit (left)

The invention claimed is:
1. Image processing apparatus comprising processing circuitry configured to:
obtain a display image to be displayed on a display unit in accordance with motion of a viewpoint of a driver, on a basis of a captured image obtained by capturing an image on a rear side from a vehicle, when a line-of-sight of the driver is in a certain region including the display unit,
superimpose an image showing the vehicle on the captured image to obtain the display image;

register, as a reference viewpoint position, a viewpoint position of the driver in a case where the line-of-sight of the driver is continuously present on the display unit for a period, longer than a first time;

not to register, as the reference viewpoint position, the viewpoint position of the driver in a case where the line-of-sight of the driver is continuously present on the display unit for a period shorter than the first time on the display unit;

change a positional relationship between the superimposed image showing the vehicle on the captured image in accordance with a deviation of the viewpoint position of the driver from the reference viewpoint position; and update the reference viewpoint position on a basis of a fluctuation of the viewpoint position over a fixed interval unless a line-of-sight of the driver is in the certain region.

2. The image processing apparatus according to claim 1, wherein the processing circuitry is further configured to average, for the fixed interval, the viewpoint position of the driver obtained sequentially at a predetermined sample rate, to obtain an update value of the reference viewpoint position.

3. The image processing apparatus according to claim 1, wherein the processing circuitry is further configured to register, as the reference viewpoint position, a viewpoint position of the driver in a case where a line-of-sight of the driver is continuously present for a certain period of time on the display unit that displays the display image, when a viewpoint position of the driver enters a certain region corresponding to a seated state.

4. The image processing apparatus according to claim 1, wherein an image showing the vehicle includes a computer graphics image.

5. The image processing apparatus according to claim 1, wherein a captured image obtained by capturing an image on a rear side from the vehicle includes a captured image captured by an image capturing device attached to a rear part of the vehicle, and
wherein an image showing the vehicle includes a vehicle interior image.

6. The image processing apparatus according to claim 1, wherein a captured image obtained by capturing an image on a rear side from the vehicle includes a captured image captured by an image capturing device attached to a side part of the vehicle, and
wherein an image showing the vehicle includes a vehicle body image.

7. The image processing apparatus according to claim 1, wherein the processing circuitry is further configured to:
arrange the captured image and the image showing the vehicle in a three-dimensional space,
obtain a virtual viewpoint position that changes in accordance with a deviation of a viewpoint position of the driver from the reference viewpoint position, and
convert the captured image and the image showing the vehicle into a projected coordinate system with a visual field determined by the virtual viewpoint position, to obtain the display image.

8. The image processing apparatus according to claim 7, wherein the processing circuitry is further configured to arrange the captured image at a position of a predetermined object existing on a rear side from the vehicle.

9. The image processing apparatus according to claim 8, wherein the predetermined object includes an object closest to the vehicle.

10. The image processing apparatus according to claim 8, wherein the predetermined object includes an object being seen by the driver.

11. The image processing apparatus according to claim 1, wherein the processing circuitry is further configured to superimpose the image showing the vehicle on the captured image to allow the captured image to be seen through.

12. An image processing method comprising:
obtaining a display image to be displayed on a display unit in accordance with motion of a viewpoint of a driver, on a basis of a captured image obtained by capturing an image on a rear side from a vehicle, when a line-of-sight of the driver is in a certain region including the display unit;
superimposing an image showing the vehicle on the captured image to obtain the display image; and
registering, as a reference viewpoint position, a viewpoint position of the driver in a case where the line-of-sight of the driver is continuously present on the display unit for a period longer than a first time;
not registering as the reference viewpoint position, the viewpoint position of the driver in a case where the line-of-sight of the driver is continuously present on the display unit for a period shorter than the first time on the display unit;
changing a positional relationship between the superimposed captured image and the image showing the vehicle in accordance with a deviation of the viewpoint position of the driver from the reference viewpoint position; and
updating the reference viewpoint position on a basis of a fluctuation of the viewpoint position over a fixed interval unless a line-of-sight of the driver is in the certain region.

13. The image processing method according to claim 12, further comprising averaging, for the fixed interval, the viewpoint position of the driver obtained sequentially at a predetermined sample rate to obtain an update value of the reference viewpoint position.

14. The image processing method according to claim 12, further comprising:
arranging the captured image and the image showing the vehicle in a three-dimensional space;
obtaining a virtual viewpoint position that changes in accordance with a deviation of a viewpoint position of the driver from the reference viewpoint position; and
converting the captured image and the image showing the vehicle into a projected coordinate system with a visual field determined by the virtual viewpoint position, to obtain the display image.

15. The image processing method according to claim 14, further comprising arranging the captured image at a position of a predetermined object existing on a rear side from the vehicle.

16. The image processing method according to claim 15, wherein the predetermined object includes an object closest to the vehicle.

17. An image processing system comprising:
an imager configured to capture an image on a rear side from a vehicle;
processing circuitry configured to:
obtain a display image in accordance with motion of a viewpoint of a driver, on a basis of a captured image obtained by capturing an image with the image capturing unit, when a line-of-sight of the driver is in a certain region including a display;

superimpose an image showing the vehicle on the captured image to obtain the display image;

register, as a reference viewpoint position, a viewpoint position of the driver in a case where the line-of-sight of the driver is continuously present on the display unit for a period longer than a first time;

not to register, as the reference viewpoint position, the viewpoint position of the driver in a case where the line-of-sight of the driver is continuously present on the display unit for a period shorter than the first time on the display unit;

change a positional relationship between the superimposed image showing the vehicle on the captured image in accordance with a deviation of the viewpoint position of the driver from the reference viewpoint position; and update the reference viewpoint position on a basis of a fluctuation of the viewpoint position over a fixed interval unless a line-of-sight of the driver is in the certain region.

18. The image processing system according to claim 17, wherein the processing circuitry is further configured to average, for the fixed interval, the viewpoint position of the driver obtained sequentially at a predetermined sample rate to obtain an update value of the reference viewpoint position.

19. The image processing system according to claim 17, wherein the processing circuitry is further configured to:

arrange the captured image and the image showing the vehicle in a three-dimensional space;

obtain a virtual viewpoint position that changes in accordance with a deviation of a viewpoint position of the driver from the reference viewpoint position; and convert the captured image and the image showing the vehicle into a projected coordinate system with a visual field determined by the virtual viewpoint position, to obtain the display image.

20. The image processing system according to claim 19, wherein the processing circuitry is further configured to arrange the captured image at a position of a predetermined object existing on a rear side from the vehicle.

* * * * *